US012644427B2

(12) United States Patent
Bowden et al.

(10) Patent No.: US 12,644,427 B2
(45) Date of Patent: *Jun. 2, 2026

(54) GAS TURBINE ENGINE WITH THIRD STREAM

(71) Applicant: General Electric Company, Evendale, OH (US)

(72) Inventors: William Joseph Bowden, Cleves, OH (US); David Marion Ostdiek, Liberty Township, OH (US); Ian McKnight, West Chester, OH (US); Syed J. Khalid, Palm Beach Gardens, FL (US); Brandon Wayne Miller, Liberty Township, OH (US); Randy M. Vondrell, Cincinnati, OH (US); Craig William Higgins, Liberty Township, OH (US); Alexander Kimberley Simpson, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/042,124

(22) Filed: Jan. 31, 2025

(65) Prior Publication Data

US 2025/0172110 A1 May 29, 2025

Related U.S. Application Data

(63) Continuation-in-part of application No. 18/888,873, filed on Sep. 18, 2024, now Pat. No. 12,410,763, (Continued)

(51) Int. Cl.
F02K 3/065 (2006.01)
F02C 3/06 (2006.01)

(52) U.S. Cl.
CPC ................ *F02K 3/065* (2013.01); *F02C 3/06* (2013.01)

(58) Field of Classification Search
CPC . F02K 3/02; F02K 3/025; F02K 3/065; F02C 3/06; F02C 3/107; F02C 7/36
See application file for complete search history.

(56) References Cited

U.S. PATENT DOCUMENTS

| | | | |
|---|---|---|---|
| 2,999,630 A | 9/1961 | Warren et al. | |
| 3,528,250 A | 9/1970 | Johnson | |

(Continued)

FOREIGN PATENT DOCUMENTS

| | | |
|---|---|---|
| CN | 1204005 A | 1/1999 |
| CN | 101657607 A | 2/2010 |

(Continued)

OTHER PUBLICATIONS

Crigler, Application of Theodorsen's Theory to Propeller Design, NACA (National Advisory Committee for Aeronautics) Report 924, 1948, pp. 83-99.

(Continued)

*Primary Examiner* — Steven M Sutherland
(74) *Attorney, Agent, or Firm* — Dority & Manning, P.A.

(57) ABSTRACT

A gas turbine engine is provided. The gas turbine engine includes a turbomachine defining an engine inlet to an inlet duct, a fan duct inlet to a fan duct, and a core inlet to a core duct; a primary fan driven by the turbomachine; and a secondary fan located downstream of the primary fan within the inlet duct. The gas turbine engine defines a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass (Continued)

ratio is a ratio of the airflow through the fan duct to the airflow through the core duct.

20 Claims, 31 Drawing Sheets

Related U.S. Application Data which is a continuation-in-part of application No. 18/675,270, filed on May 28, 2024, which is a continuation of application No. 17/879,384, filed on Aug. 2, 2022, now Pat. No. 12,031,504.

(56)                    References Cited

U.S. PATENT DOCUMENTS

| | | | |
|---|---|---|---|
| 3,540,682 | A | 11/1970 | Dibble et al. |
| 3,542,152 | A | 11/1970 | Adamson et al. |
| 3,750,402 | A | 8/1973 | Vdoviak et al. |
| 4,010,608 | A | 3/1977 | Simmons |
| 4,043,121 | A | 8/1977 | Thomas et al. |
| 4,446,696 | A | 5/1984 | Sargisson et al. |
| 4,486,146 | A | 12/1984 | Campion |
| 4,569,199 | A | 2/1986 | Klees et al. |
| 4,607,657 | A | 8/1986 | Hirschkron |
| 4,784,575 | A | 11/1988 | Nelson et al. |
| 4,860,537 | A | 8/1989 | Taylor |
| 4,892,269 | A | 1/1990 | Greco et al. |
| 4,907,946 | A | 3/1990 | Ciokajlo et al. |
| 4,916,894 | A | 4/1990 | Adamson et al. |
| 4,976,102 | A | 12/1990 | Taylor |
| 5,054,998 | A | 10/1991 | Davenport |
| 5,190,441 | A | 3/1993 | Murphy et al. |
| 5,197,855 | A | 3/1993 | Magliozzi et al. |
| 5,259,187 | A | 11/1993 | Dunbar et al. |
| 5,261,227 | A | 11/1993 | Giffin, III |
| 5,345,760 | A | 9/1994 | Giffin, III |
| 5,457,346 | A | 10/1995 | Blumberg et al. |
| 5,950,308 | A | 9/1999 | Koff et al. |
| 6,339,927 | B1 | 1/2002 | DiPietro, Jr. |
| 6,547,518 | B1 | 4/2003 | Czachor et al. |
| 6,763,654 | B2 | 7/2004 | Orlando et al. |
| 6,792,758 | B2 | 9/2004 | Dowman |
| 7,559,191 | B2 | 7/2009 | Parks |
| 7,658,063 | B1 | 2/2010 | Matheny |
| 7,762,766 | B2 | 7/2010 | Shteyman et al. |
| 8,256,202 | B1 | 9/2012 | Paulino |
| 8,276,392 | B2 | 10/2012 | van der Woude |
| 8,382,430 | B2 | 2/2013 | Parry et al. |
| 8,459,035 | B2 | 6/2013 | Smith et al. |
| 8,689,538 | B2 | 4/2014 | Sankrithi et al. |
| 8,762,766 | B2 | 6/2014 | Ferguson et al. |
| 8,876,465 | B2 | 11/2014 | Stretton |
| 8,910,465 | B2 | 12/2014 | Snyder |
| 8,943,796 | B2 | 2/2015 | McCaffrey |
| 8,967,967 | B2 | 3/2015 | Stretton et al. |
| 9,017,028 | B2 | 4/2015 | Fabre |
| 9,045,996 | B2 | 6/2015 | Anghel et al. |
| 9,057,328 | B2 | 6/2015 | Kupratis |
| 9,096,312 | B2 | 8/2015 | Moxon |
| 9,097,134 | B2 | 8/2015 | Ferch et al. |
| 9,534,538 | B1 | 1/2017 | Cerny |
| 9,677,501 | B2 | 6/2017 | Pierluissi et al. |
| 9,759,160 | B2 | 9/2017 | Sankrithi et al. |
| 9,845,768 | B2 | 12/2017 | Pesyna et al. |
| 9,982,555 | B2 | 5/2018 | Thet et al. |
| 9,995,314 | B2 | 6/2018 | Miller et al. |
| 10,077,660 | B2 | 9/2018 | Hoefer et al. |
| 10,090,676 | B2 | 10/2018 | Knowles et al. |
| 10,126,062 | B2 | 11/2018 | Cerny et al. |
| 10,184,400 | B2 | 1/2019 | Cerny et al. |
| 10,202,865 | B2 | 2/2019 | Breeze-Stringfellow et al. |
| 10,253,648 | B2 | 4/2019 | Bentley et al. |
| 10,260,419 | B2 | 4/2019 | Cerny et al. |
| 10,263,550 | B2 | 4/2019 | Thet et al. |

| | | | |
|---|---|---|---|
| 10,344,674 | B2 | 7/2019 | Cerny et al. |
| 10,364,750 | B2 | 7/2019 | Rambo |
| 10,443,436 | B2 | 10/2019 | Miller et al. |
| 10,487,739 | B2 | 11/2019 | Miller et al. |
| 10,644,630 | B2 | 5/2020 | Smith et al. |
| 10,787,996 | B2 | 9/2020 | Kupratis et al. |
| 2004/0197187 | A1 | 10/2004 | Usab et al. |
| 2004/0234372 | A1 | 11/2004 | Shahpar |
| 2005/0109012 | A1 | 5/2005 | Johnson |
| 2005/0241292 | A1 | 11/2005 | Taylor et al. |
| 2007/0186535 | A1 | 8/2007 | Powell et al. |
| 2007/0251212 | A1 | 11/2007 | Tester |
| 2009/0078819 | A1 | 3/2009 | Guering et al. |
| 2009/0090096 | A1 | 4/2009 | Sheridan |
| 2010/0014977 | A1 | 1/2010 | Shattuck |
| 2010/0111674 | A1 | 5/2010 | Sparks |
| 2010/0251726 | A1 | 10/2010 | Jones et al. |
| 2010/0326050 | A1 | 12/2010 | Schilling et al. |
| 2010/0329856 | A1 | 12/2010 | Hofer et al. |
| 2011/0150659 | A1 | 6/2011 | Micheli et al. |
| 2011/0192166 | A1 | 8/2011 | Mulcaire |
| 2012/0177493 | A1 | 7/2012 | Fabre |
| 2013/0098050 | A1 | 4/2013 | Kupratis |
| 2013/0104521 | A1 | 5/2013 | Kupratis |
| 2013/0104522 | A1 | 5/2013 | Kupratis |
| 2013/0104560 | A1 | 5/2013 | Kupratis |
| 2014/0133982 | A1 | 5/2014 | Dejeu et al. |
| 2014/0345253 | A1 | 11/2014 | Dawson et al. |
| 2014/0345254 | A1 | 11/2014 | Dawson et al. |
| 2015/0003993 | A1 | 1/2015 | Kim et al. |
| 2015/0098813 | A1 | 4/2015 | Jarrett, Jr. |
| 2015/0121893 | A1 | 5/2015 | Kupratis |
| 2015/0247462 | A1* | 9/2015 | Suciu ........................ F02C 7/18 |
| | | | 415/144 |
| 2015/0284070 | A1 | 10/2015 | Breeze-Stringfellow et al. |
| 2015/0291276 | A1 | 10/2015 | Zatorski et al. |
| 2016/0010487 | A1 | 1/2016 | Breeze-Stringfellow et al. |
| 2016/0053692 | A1 | 2/2016 | Izquierdo |
| 2016/0090863 | A1 | 3/2016 | Diaz et al. |
| 2016/0160647 | A1 | 6/2016 | Hofer et al. |
| 2016/0230658 | A1 | 8/2016 | Hanlon et al. |
| 2016/0298550 | A1 | 10/2016 | Kupratis et al. |
| 2016/0333734 | A1 | 11/2016 | Bowden et al. |
| 2016/0347463 | A1 | 12/2016 | Negulescu |
| 2017/0051678 | A1 | 2/2017 | Becker, Jr. |
| 2017/0051680 | A1 | 2/2017 | Becker, Jr. et al. |
| 2017/0102006 | A1 | 4/2017 | Miller et al. |
| 2017/0114721 | A1 | 4/2017 | Miller et al. |
| 2017/0167382 | A1 | 6/2017 | Miller et al. |
| 2017/0175640 | A1 | 6/2017 | Glessner et al. |
| 2017/0184027 | A1 | 6/2017 | Moniz et al. |
| 2017/0198719 | A1 | 7/2017 | Cerny et al. |
| 2018/0065727 | A1 | 3/2018 | Gruber et al. |
| 2018/0118364 | A1 | 5/2018 | Golshany et al. |
| 2018/0215475 | A1 | 8/2018 | Hurt et al. |
| 2018/0283795 | A1 | 10/2018 | Cerny et al. |
| 2019/0136710 | A1 | 5/2019 | Breeze-Stringfellow et al. |
| 2019/0153952 | A1 | 5/2019 | Niergarth et al. |
| 2019/0153953 | A1 | 5/2019 | Niergarth et al. |
| 2019/0218971 | A1 | 7/2019 | Niergarth et al. |
| 2019/0249599 | A1 | 8/2019 | Sen et al. |
| 2019/0257247 | A1 | 8/2019 | Pal et al. |
| 2019/0360401 | A1 | 11/2019 | Rambo et al. |
| 2020/0025109 | A1 | 1/2020 | Stieger et al. |
| 2020/0095939 | A1 | 3/2020 | Epstein |
| 2020/0116104 | A1 | 4/2020 | Levisse et al. |
| 2020/0290741 | A1 | 9/2020 | Peace et al. |
| 2020/0332718 | A1 | 10/2020 | Rambo |
| 2021/0108573 | A1 | 4/2021 | Sibbach et al. |
| 2021/0108595 | A1 | 4/2021 | Khalid et al. |
| 2021/0108597 | A1 | 4/2021 | Ostdiek et al. |
| 2022/0042463 | A1 | 2/2022 | Molesini et al. |
| 2022/0056811 | A1 | 2/2022 | Molesini et al. |
| 2023/0073647 | A1 | 3/2023 | Glessner et al. |

FOREIGN PATENT DOCUMENTS

| | | | |
|---|---|---|---|
| DE | | 1081277 B | 5/1960 |
| EP | | 0385913 A1 | 9/1990 |

(56) References Cited

FOREIGN PATENT DOCUMENTS

| | | | |
|---|---|---|---|
| EP | 0887259 | A2 | 12/1998 |
| EP | 1493900 | A2 | 1/2005 |
| EP | 1988274 | A2 | 11/2008 |
| EP | 2540989 | A2 | 1/2013 |
| EP | 2562082 | A2 | 2/2013 |
| EP | 3093443 | A1 | 11/2016 |
| GB | 2100799 | A | 1/1983 |
| GB | 2196390 | A | 4/1988 |
| GB | 2461811 | A | 1/2010 |
| JP | H0370698 | A | 3/1991 |
| JP | 2006/123880 | A | 5/2006 |
| JP | 2009/508748 | A | 3/2009 |
| JP | 2011/527263 | A | 10/2011 |
| KR | 101179277 | B1 | 9/2012 |
| WO | WO2004/033295 | A1 | 4/2004 |
| WO | WO2005/111413 | A1 | 11/2005 |
| WO | WO2011/020458 | A2 | 2/2011 |
| WO | WO2011/094477 | A2 | 8/2011 |
| WO | WO2011/107320 | A1 | 9/2011 |
| WO | WO2014/143248 | A1 | 9/2014 |

OTHER PUBLICATIONS

Naveen et al., CFD Analysis of Low Pressure Turbine Blade Using Vortex Generator Jets, Proceedings of 7th International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.
Smith Jr, Unducted Fan Aerodynamic Design, Journal of Turbomachinery, vol. 109, Jul. 1987, pp. 313-324.
Theodorsen, Theory of Propellers, Wartime Report, NACA (National Advisory Committee for Aeronautics), Aug. 1944, pp. 1-53.
Yamamoto et al., Numerical Calculation of Propfan/Swirl Recovery Vane Flow Field, AIAA-92-3771, AIAA//SAE/ASME/ASEE 28th Joint Propulsion Conference and Exhibit, Jul. 6-8, 1992, Nashville TN, pp. 1-9.

* cited by examiner

| R1/R3 | TPAR | CBR | RqRPrim.-FAN | RqRSec.-FAN |
|---|---|---|---|---|
| 1.489 | 4.7 | 1.41 | 0.25 | 0.60 |
| 1.581 | 4.9 | 1.01 | 0.25 | 0.60 |
| 1.663 | 5.1 | 0.65 | 0.25 | 0.60 |
| 1.758 | 5.2 | 0.35 | 0.25 | 0.60 |
| 1.420 | 7.6 | 2.31 | 0.25 | 0.60 |
| 1.508 | 7.8 | 1.63 | 0.25 | 0.60 |
| 1.587 | 8.0 | 1.04 | 0.25 | 0.60 |
| 1.677 | 8.1 | 0.56 | 0.25 | 0.60 |
| 1.930 | 8.2 | 0.11 | 0.25 | 0.60 |
| 1.330 | 12.2 | 3.82 | 0.25 | 0.60 |
| 1.412 | 12.4 | 2.66 | 0.25 | 0.60 |
| 1.486 | 12.6 | 1.68 | 0.25 | 0.60 |
| 1.581 | 12.7 | 0.99 | 0.30 | 0.60 |
| 1.610 | 12.7 | 0.99 | 0.35 | 0.60 |
| 1.610 | 12.7 | 0.99 | 0.35 | 0.60 |
| 1.812 | 12.7 | 0.99 | 0.25 | 0.55 |
| 1.839 | 12.7 | 0.99 | 0.30 | 0.55 |
| 1.873 | 12.7 | 0.99 | 0.35 | 0.55 |
| 1.873 | 12.7 | 0.99 | 0.35 | 0.55 |
| 1.223 | 12.7 | 0.99 | 0.25 | 0.65 |
| 1.242 | 12.7 | 0.99 | 0.30 | 0.65 |
| 1.264 | 12.7 | 0.99 | 0.35 | 0.65 |
| 1.264 | 12.7 | 0.99 | 0.35 | 0.65 |
| 1.570 | 12.7 | 0.91 | 0.25 | 0.60 |
| 1.628 | 12.7 | 0.71 | 0.30 | 0.60 |
| 1.658 | 12.7 | 0.71 | 0.35 | 0.60 |
| 1.658 | 12.7 | 0.71 | 0.35 | 0.60 |
| 1.876 | 12.7 | 0.71 | 0.25 | 0.55 |
| 1.904 | 12.7 | 0.71 | 0.30 | 0.55 |
| 1.939 | 12.7 | 0.71 | 0.35 | 0.55 |
| 1.939 | 12.7 | 0.71 | 0.35 | 0.55 |
| 1.242 | 12.7 | 0.71 | 0.25 | 0.65 |
| 1.260 | 12.7 | 0.71 | 0.30 | 0.65 |
| 1.283 | 12.7 | 0.71 | 0.35 | 0.65 |
| 1.283 | 12.7 | 0.71 | 0.35 | 0.65 |
| 1.702 | 12.8 | 0.42 | 0.30 | 0.60 |
| 1.733 | 12.8 | 0.42 | 0.35 | 0.60 |
| 1.733 | 12.8 | 0.42 | 0.35 | 0.60 |
| 1.973 | 12.8 | 0.42 | 0.25 | 0.55 |
| 2.003 | 12.8 | 0.42 | 0.30 | 0.55 |
| 2.039 | 12.8 | 0.42 | 0.35 | 0.55 |
| 2.039 | 12.8 | 0.42 | 0.35 | 0.55 |
| 1.278 | 12.8 | 0.42 | 0.25 | 0.65 |
| 1.298 | 12.8 | 0.42 | 0.30 | 0.65 |

FIG. 4A

| R1/R3 | TPAR | CBR | RqRPrim.-FAN | RqRSec.-FAN |
|---|---|---|---|---|
| 1.321 | 12.8 | 0.42 | 0.35 | 0.65 |
| 1.321 | 12.8 | 0.42 | 0.35 | 0.65 |
| 1.812 | 12.8 | 0.17 | 0.25 | 0.60 |
| 1.839 | 12.8 | 0.17 | 0.30 | 0.60 |
| 1.873 | 12.8 | 0.17 | 0.35 | 0.60 |
| 1.873 | 12.8 | 0.17 | 0.35 | 0.60 |
| 2.144 | 12.8 | 0.17 | 0.25 | 0.55 |
| 2.176 | 12.8 | 0.17 | 0.30 | 0.55 |
| 2.216 | 12.8 | 0.17 | 0.35 | 0.55 |
| 2.216 | 12.8 | 0.17 | 0.35 | 0.55 |
| 1.362 | 12.8 | 0.17 | 0.25 | 0.65 |
| 1.383 | 12.8 | 0.17 | 0.30 | 0.65 |
| 1.408 | 12.8 | 0.17 | 0.35 | 0.65 |
| 1.408 | 12.8 | 0.17 | 0.35 | 0.65 |
| 2.492 | 13.2 | 2.84 | 0.25 | 0.60 |
| 2.295 | 13.3 | 2.99 | 0.25 | 0.60 |
| 2.010 | 13.5 | 3.26 | 0.25 | 0.60 |
| 1.788 | 13.7 | 3.55 | 0.25 | 0.60 |
| 2.671 | 13.8 | 2.11 | 0.30 | 0.60 |
| 2.720 | 13.8 | 2.11 | 0.35 | 0.60 |
| 2.720 | 13.8 | 2.11 | 0.35 | 0.60 |
| 2.969 | 13.8 | 2.11 | 0.25 | 0.55 |
| 3.013 | 13.8 | 2.11 | 0.30 | 0.55 |
| 3.068 | 13.8 | 2.11 | 0.35 | 0.55 |
| 3.068 | 13.8 | 2.11 | 0.35 | 0.55 |
| 2.209 | 13.8 | 2.11 | 0.25 | 0.65 |
| 2.242 | 13.8 | 2.11 | 0.30 | 0.65 |
| 2.283 | 13.8 | 2.11 | 0.35 | 0.65 |
| 2.283 | 13.8 | 2.11 | 0.35 | 0.65 |
| 2.647 | 13.9 | 2.03 | 0.25 | 0.60 |
| 2.780 | 14.2 | 1.54 | 0.30 | 0.60 |
| 2.831 | 14.2 | 1.54 | 0.35 | 0.60 |
| 2.831 | 14.2 | 1.54 | 0.35 | 0.60 |
| 3.129 | 14.2 | 1.54 | 0.25 | 0.55 |
| 3.176 | 14.2 | 1.54 | 0.30 | 0.55 |
| 3.234 | 14.2 | 1.54 | 0.35 | 0.55 |
| 3.234 | 14.2 | 1.54 | 0.35 | 0.55 |
| 2.239 | 14.2 | 1.54 | 0.25 | 0.65 |
| 2.273 | 14.2 | 1.54 | 0.30 | 0.65 |
| 2.314 | 14.2 | 1.54 | 0.35 | 0.65 |
| 2.314 | 14.2 | 1.54 | 0.35 | 0.65 |
| 2.783 | 14.4 | 1.32 | 0.25 | 0.60 |
| 2.920 | 14.6 | 0.93 | 0.30 | 0.60 |
| 2.973 | 14.6 | 0.93 | 0.35 | 0.60 |

FIG. 4B

| R1/R3 | TPAR | CBR | RqRPrim.-FAN | RqRSec.-FAN |
|---|---|---|---|---|
| 2.973 | 14.6 | 0.93 | 0.35 | 0.60 |
| 3.334 | 14.6 | 0.93 | 0.25 | 0.55 |
| 3.384 | 14.6 | 0.93 | 0.30 | 0.55 |
| 3.446 | 14.6 | 0.93 | 0.35 | 0.55 |
| 3.446 | 14.6 | 0.93 | 0.35 | 0.55 |
| 2.277 | 14.6 | 0.93 | 0.25 | 0.65 |
| 2.311 | 14.6 | 0.93 | 0.30 | 0.65 |
| 2.354 | 14.6 | 0.93 | 0.35 | 0.65 |
| 2.354 | 14.6 | 0.93 | 0.35 | 0.65 |
| 2.942 | 14.8 | 0.72 | 0.25 | 0.60 |
| 3.376 | 15.1 | 0.14 | 0.25 | 0.60 |
| 3.427 | 15.1 | 0.14 | 0.30 | 0.60 |
| 3.490 | 15.1 | 0.14 | 0.35 | 0.60 |
| 3.490 | 15.1 | 0.14 | 0.35 | 0.60 |
| 3.994 | 15.1 | 0.14 | 0.25 | 0.55 |
| 4.054 | 15.1 | 0.14 | 0.30 | 0.55 |
| 4.129 | 15.1 | 0.14 | 0.35 | 0.55 |
| 4.129 | 15.1 | 0.14 | 0.35 | 0.55 |
| 2.540 | 15.1 | 0.14 | 0.25 | 0.65 |
| 2.625 | 15.1 | 0.14 | 0.35 | 0.65 |
| 1.271 | 15.5 | 4.98 | 0.25 | 0.60 |
| 1.348 | 15.7 | 3.46 | 0.25 | 0.60 |
| 1.419 | 15.8 | 2.18 | 0.25 | 0.60 |
| 1.499 | 15.9 | 1.17 | 0.25 | 0.60 |
| 1.735 | 16.0 | 0.21 | 0.25 | 0.60 |
| 2.703 | 16.6 | 3.37 | 0.25 | 0.60 |
| 2.476 | 16.7 | 3.51 | 0.25 | 0.60 |
| 2.146 | 16.9 | 3.86 | 0.25 | 0.60 |
| 2.833 | 17.0 | 2.84 | 0.30 | 0.60 |
| 2.885 | 17.0 | 2.84 | 0.35 | 0.60 |
| 2.885 | 17.0 | 2.84 | 0.35 | 0.60 |
| 3.126 | 17.0 | 2.84 | 0.25 | 0.55 |
| 3.173 | 17.0 | 2.84 | 0.30 | 0.55 |
| 3.232 | 17.0 | 2.84 | 0.35 | 0.55 |
| 3.232 | 17.0 | 2.84 | 0.35 | 0.55 |
| 2.373 | 17.0 | 2.84 | 0.25 | 0.65 |
| 2.408 | 17.0 | 2.84 | 0.30 | 0.65 |
| 2.453 | 17.0 | 2.84 | 0.35 | 0.65 |
| 2.453 | 17.0 | 2.84 | 0.35 | 0.65 |
| 1.888 | 17.2 | 4.23 | 0.25 | 0.60 |
| 2.869 | 17.3 | 2.38 | 0.25 | 0.60 |
| 3.318 | 17.6 | 2.08 | 0.25 | 0.55 |
| 3.368 | 17.6 | 2.08 | 0.30 | 0.55 |
| 3.430 | 17.6 | 2.08 | 0.35 | 0.55 |

FIG. 4C

| R1/R3 | TPAR | CBR | RqRPrim.-FAN | RqRSec.-FAN |
|-------|------|------|------|------|
| 3.430 | 17.6 | 2.08 | 0.35 | 0.55 |
| 2.415 | 17.6 | 2.08 | 0.25 | 0.65 |
| 2.452 | 17.6 | 2.08 | 0.30 | 0.65 |
| 2.497 | 17.6 | 2.08 | 0.35 | 0.65 |
| 2.497 | 17.6 | 2.08 | 0.35 | 0.65 |
| 3.019 | 17.9 | 1.54 | 0.25 | 0.60 |
| 3.123 | 18.1 | 1.26 | 0.30 | 0.60 |
| 3.181 | 18.1 | 1.26 | 0.35 | 0.60 |
| 3.181 | 18.1 | 1.26 | 0.35 | 0.60 |
| 3.554 | 18.1 | 1.26 | 0.25 | 0.55 |
| 3.607 | 18.1 | 1.26 | 0.30 | 0.55 |
| 3.673 | 18.1 | 1.26 | 0.35 | 0.55 |
| 3.673 | 18.1 | 1.26 | 0.35 | 0.55 |
| 2.457 | 18.1 | 1.26 | 0.25 | 0.65 |
| 2.494 | 18.1 | 1.26 | 0.30 | 0.65 |
| 2.540 | 18.1 | 1.26 | 0.35 | 0.65 |
| 2.540 | 18.1 | 1.26 | 0.35 | 0.65 |
| 3.190 | 18.4 | 0.84 | 0.25 | 0.60 |
| 3.376 | 18.6 | 0.52 | 0.30 | 0.60 |
| 3.962 | 18.6 | 0.52 | 0.30 | 0.55 |
| 4.034 | 18.6 | 0.52 | 0.35 | 0.55 |
| 4.034 | 18.6 | 0.52 | 0.35 | 0.55 |
| 2.555 | 18.6 | 0.52 | 0.25 | 0.65 |
| 2.593 | 18.6 | 0.52 | 0.30 | 0.65 |
| 2.641 | 18.6 | 0.52 | 0.35 | 0.65 |
| 2.641 | 18.6 | 0.52 | 0.35 | 0.65 |
| 3.579 | 18.8 | 0.26 | 0.30 | 0.60 |
| 3.645 | 18.8 | 0.26 | 0.35 | 0.60 |
| 3.645 | 18.8 | 0.26 | 0.35 | 0.60 |
| 4.162 | 18.8 | 0.26 | 0.25 | 0.55 |
| 4.225 | 18.8 | 0.26 | 0.30 | 0.55 |
| 4.302 | 18.8 | 0.26 | 0.35 | 0.55 |
| 4.302 | 18.8 | 0.26 | 0.35 | 0.55 |
| 2.668 | 18.8 | 0.26 | 0.25 | 0.65 |
| 2.708 | 18.8 | 0.26 | 0.30 | 0.65 |
| 2.757 | 18.8 | 0.26 | 0.35 | 0.65 |
| 2.757 | 18.8 | 0.26 | 0.35 | 0.65 |
| 3.683 | 18.8 | 0.16 | 0.25 | 0.60 |
| 3.797 | 18.8 | 0.13 | 0.30 | 0.60 |
| 3.867 | 18.8 | 0.13 | 0.35 | 0.60 |
| 3.867 | 18.8 | 0.13 | 0.35 | 0.60 |
| 4.578 | 18.8 | 0.13 | 0.35 | 0.55 |
| 4.578 | 18.8 | 0.13 | 0.35 | 0.55 |
| 2.807 | 18.8 | 0.13 | 0.25 | 0.65 |

FIG. 4D

| R1/R3 | TPAR | CBR | RqRPrim.-FAN | RqRSec.-FAN |
|---|---|---|---|---|
| 2.849 | 18.8 | 0.13 | 0.30 | 0.65 |
| 2.902 | 18.8 | 0.13 | 0.35 | 0.65 |
| 2.902 | 18.8 | 0.13 | 0.35 | 0.65 |
| 3.018 | 21.8 | 3.94 | 0.25 | 0.60 |
| 2.746 | 21.9 | 4.17 | 0.25 | 0.60 |
| 2.349 | 22.1 | 4.63 | 0.25 | 0.60 |
| 2.039 | 22.4 | 5.12 | 0.25 | 0.60 |
| 3.205 | 22.6 | 2.80 | 0.25 | 0.60 |
| 3.372 | 23.3 | 1.80 | 0.25 | 0.60 |
| 3.563 | 23.9 | 0.99 | 0.25 | 0.60 |
| 4.108 | 24.4 | 0.19 | 0.25 | 0.60 |
| 3.273 | 26.1 | 4.35 | 0.25 | 0.60 |
| 2.965 | 26.2 | 4.63 | 0.25 | 0.60 |
| 2.515 | 26.4 | 5.16 | 0.25 | 0.60 |
| 2.162 | 26.7 | 5.75 | 0.25 | 0.60 |
| 3.473 | 27.0 | 3.10 | 0.25 | 0.60 |
| 3.656 | 27.8 | 1.99 | 0.25 | 0.60 |
| 3.867 | 28.4 | 1.07 | 0.25 | 0.60 |
| 4.428 | 28.9 | 0.22 | 0.25 | 0.60 |
| 2.674 | 30.5 | 5.59 | 0.25 | 0.60 |
| 2.281 | 30.8 | 6.27 | 0.25 | 0.60 |
| 3.732 | 31.2 | 3.32 | 0.25 | 0.60 |
| 3.927 | 32.0 | 2.13 | 0.25 | 0.60 |
| 4.150 | 32.7 | 1.16 | 0.25 | 0.60 |
| 4.788 | 33.3 | 0.22 | 0.25 | 0.60 |
| 3.799 | 35.1 | 5.03 | 0.25 | 0.60 |
| 3.420 | 35.2 | 5.35 | 0.25 | 0.60 |
| 2.862 | 35.4 | 6.02 | 0.25 | 0.60 |
| 3.959 | 35.5 | 4.41 | 0.30 | 0.60 |
| 4.032 | 35.5 | 4.41 | 0.35 | 0.60 |
| 4.032 | 35.5 | 4.41 | 0.35 | 0.60 |
| 4.362 | 35.5 | 4.41 | 0.25 | 0.55 |
| 4.427 | 35.5 | 4.41 | 0.30 | 0.55 |
| 4.508 | 35.5 | 4.41 | 0.35 | 0.55 |
| 4.508 | 35.5 | 4.41 | 0.35 | 0.55 |
| 3.327 | 35.5 | 4.41 | 0.25 | 0.65 |
| 3.377 | 35.5 | 4.41 | 0.30 | 0.65 |
| 3.439 | 35.5 | 4.41 | 0.35 | 0.65 |
| 3.439 | 35.5 | 4.41 | 0.35 | 0.65 |
| 2.422 | 35.7 | 6.79 | 0.25 | 0.60 |
| 4.035 | 36.2 | 3.55 | 0.25 | 0.60 |
| 4.682 | 36.5 | 3.02 | 0.25 | 0.55 |
| 4.752 | 36.5 | 3.02 | 0.30 | 0.55 |
| 4.839 | 36.5 | 3.02 | 0.35 | 0.55 |

FIG. 4E

| R1/R3 | TPAR | CBR | RqRPrim.-FAN | RqRSec.-FAN |
|---|---|---|---|---|
| 4.839 | 36.5 | 3.02 | 0.35 | 0.55 |
| 3.400 | 36.5 | 3.02 | 0.25 | 0.65 |
| 3.451 | 36.5 | 3.02 | 0.30 | 0.65 |
| 3.514 | 36.5 | 3.02 | 0.35 | 0.65 |
| 3.514 | 36.5 | 3.02 | 0.35 | 0.65 |
| 4.245 | 37.0 | 2.27 | 0.25 | 0.60 |
| 4.464 | 37.5 | 1.55 | 0.30 | 0.60 |
| 4.546 | 37.5 | 1.55 | 0.35 | 0.60 |
| 4.546 | 37.5 | 1.55 | 0.35 | 0.60 |
| 5.101 | 37.5 | 1.55 | 0.25 | 0.55 |
| 5.177 | 37.5 | 1.55 | 0.30 | 0.55 |
| 5.272 | 37.5 | 1.55 | 0.35 | 0.55 |
| 5.272 | 37.5 | 1.55 | 0.35 | 0.55 |
| 3.477 | 37.5 | 1.55 | 0.25 | 0.65 |
| 3.529 | 37.5 | 1.55 | 0.30 | 0.65 |
| 3.594 | 37.5 | 1.55 | 0.35 | 0.65 |
| 3.594 | 37.5 | 1.55 | 0.35 | 0.65 |
| 4.487 | 37.7 | 1.23 | 0.25 | 0.60 |
| 5.162 | 38.3 | 0.24 | 0.25 | 0.60 |
| 6.208 | 38.4 | 0.20 | 0.25 | 0.55 |
| 6.301 | 38.4 | 0.20 | 0.30 | 0.55 |
| 6.417 | 38.4 | 0.20 | 0.35 | 0.55 |
| 6.417 | 38.4 | 0.20 | 0.35 | 0.55 |
| 3.936 | 38.4 | 0.20 | 0.25 | 0.65 |
| 3.995 | 38.4 | 0.20 | 0.30 | 0.65 |
| 4.069 | 38.4 | 0.20 | 0.35 | 0.65 |
| 4.069 | 38.4 | 0.20 | 0.35 | 0.65 |
| 4.185 | 41.8 | 5.36 | 0.25 | 0.60 |
| 3.754 | 41.9 | 5.73 | 0.25 | 0.60 |
| 3.118 | 42.1 | 6.48 | 0.25 | 0.60 |
| 2.616 | 42.5 | 7.36 | 0.25 | 0.60 |
| 4.446 | 42.9 | 3.77 | 0.25 | 0.60 |
| 4.677 | 43.8 | 2.41 | 0.25 | 0.60 |
| 4.943 | 44.5 | 1.30 | 0.25 | 0.60 |
| 5.664 | 45.2 | 0.26 | 0.25 | 0.60 |
| 4.577 | 48.6 | 5.59 | 0.25 | 0.60 |
| 4.092 | 48.7 | 5.99 | 0.25 | 0.60 |
| 3.378 | 48.9 | 6.81 | 0.25 | 0.60 |
| 2.814 | 49.3 | 7.77 | 0.25 | 0.60 |
| 4.859 | 49.7 | 3.92 | 0.25 | 0.60 |
| 5.112 | 50.7 | 2.50 | 0.25 | 0.60 |
| 5.158 | 56.5 | 6.05 | 0.35 | 0.60 |
| 5.158 | 56.5 | 6.05 | 0.35 | 0.60 |
| 5.528 | 56.5 | 6.05 | 0.25 | 0.55 |

FIG. 4F

| R1/R3 | TPAR | CBR | RqRPrim.-FAN | RqRSec.-FAN |
|---|---|---|---|---|
| 5.611 | 56.5 | 6.05 | 0.30 | 0.55 |
| 5.713 | 56.5 | 6.05 | 0.35 | 0.55 |
| 5.713 | 56.5 | 6.05 | 0.35 | 0.55 |
| 4.331 | 56.5 | 6.05 | 0.25 | 0.65 |
| 4.396 | 56.5 | 6.05 | 0.30 | 0.65 |
| 4.477 | 56.5 | 6.05 | 0.35 | 0.65 |
| 4.477 | 56.5 | 6.05 | 0.35 | 0.65 |
| 5.048 | 56.7 | 5.75 | 0.25 | 0.60 |
| 4.502 | 56.8 | 6.17 | 0.25 | 0.60 |
| 3.696 | 57.1 | 7.05 | 0.25 | 0.60 |
| 3.057 | 57.5 | 8.10 | 0.25 | 0.60 |
| 5.359 | 57.9 | 4.02 | 0.25 | 0.60 |
| 5.524 | 58.2 | 3.56 | 0.30 | 0.60 |
| 5.626 | 58.2 | 3.56 | 0.35 | 0.60 |
| 5.626 | 58.2 | 3.56 | 0.35 | 0.60 |
| 6.179 | 58.2 | 3.56 | 0.25 | 0.55 |
| 6.272 | 58.2 | 3.56 | 0.30 | 0.55 |
| 6.387 | 58.2 | 3.56 | 0.35 | 0.55 |
| 6.387 | 58.2 | 3.56 | 0.35 | 0.55 |
| 4.659 | 58.2 | 3.56 | 0.35 | 0.65 |
| 4.659 | 58.2 | 3.56 | 0.35 | 0.65 |
| 5.638 | 58.8 | 2.56 | 0.25 | 0.60 |
| 5.907 | 59.3 | 1.81 | 0.30 | 0.60 |
| 6.015 | 59.3 | 1.81 | 0.35 | 0.60 |
| 6.015 | 59.3 | 1.81 | 0.35 | 0.60 |
| 6.743 | 59.3 | 1.81 | 0.25 | 0.55 |
| 6.844 | 59.3 | 1.81 | 0.30 | 0.55 |
| 6.970 | 59.3 | 1.81 | 0.35 | 0.55 |
| 6.970 | 59.3 | 1.81 | 0.35 | 0.55 |
| 4.611 | 59.3 | 1.81 | 0.25 | 0.65 |
| 4.680 | 59.3 | 1.81 | 0.30 | 0.65 |
| 4.766 | 59.3 | 1.81 | 0.35 | 0.65 |
| 4.766 | 59.3 | 1.81 | 0.35 | 0.65 |
| 5.959 | 59.6 | 1.38 | 0.25 | 0.60 |
| 6.766 | 60.2 | 0.37 | 0.30 | 0.60 |
| 6.890 | 60.2 | 0.37 | 0.35 | 0.60 |
| 6.890 | 60.2 | 0.37 | 0.35 | 0.60 |
| 7.874 | 60.2 | 0.37 | 0.25 | 0.55 |
| 7.993 | 60.2 | 0.37 | 0.30 | 0.55 |
| 8.139 | 60.2 | 0.37 | 0.35 | 0.55 |
| 8.139 | 60.2 | 0.37 | 0.35 | 0.55 |
| 5.201 | 60.2 | 0.37 | 0.35 | 0.65 |
| 6.863 | 60.2 | 0.26 | 0.25 | 0.60 |
| 5.856 | 70.3 | 5.79 | 0.25 | 0.60 |

FIG. 4G

| R1/R3 | TPAR | COR | RqRPrim.-FAN | RqRSec.-FAN |
|---|---|---|---|---|
| 5.205 | 70.4 | 6.24 | 0.25 | 0.60 |
| 4.245 | 70.7 | 7.16 | 0.25 | 0.60 |
| 3.483 | 71.2 | 8.29 | 0.25 | 0.60 |
| 6.217 | 71.4 | 4.04 | 0.25 | 0.60 |
| 6.541 | 72.3 | 2.55 | 0.25 | 0.60 |
| 6.913 | 73.0 | 1.38 | 0.25 | 0.60 |
| 7.962 | 73.7 | 0.26 | 0.25 | 0.60 |

FIG. 4H

GAS TURBINE ENGINE WITH THIRD STREAM

CROSS-REFERENCE TO RELATED APPLICATIONS

This application is a continuation in part application of U.S. application Ser. No. 18/888,873, filed Sep. 18, 2024, which is a continuation in part application of U.S. application Ser. No. 18/675,270, filed May 28, 2024, which is a continuation application of U.S. application Ser. No. 17/879, 384 filed Aug. 2, 2022. Each of these applications is hereby incorporated by reference in their entireties.

FIELD

The present disclosure relates to a gas turbine engine with a third stream.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 4A through 4H are tables depicting numerical values showing the relationships between various parameters in accordance with various example embodiments of the present disclosure.

DETAILED DESCRIPTION

Figure 1:
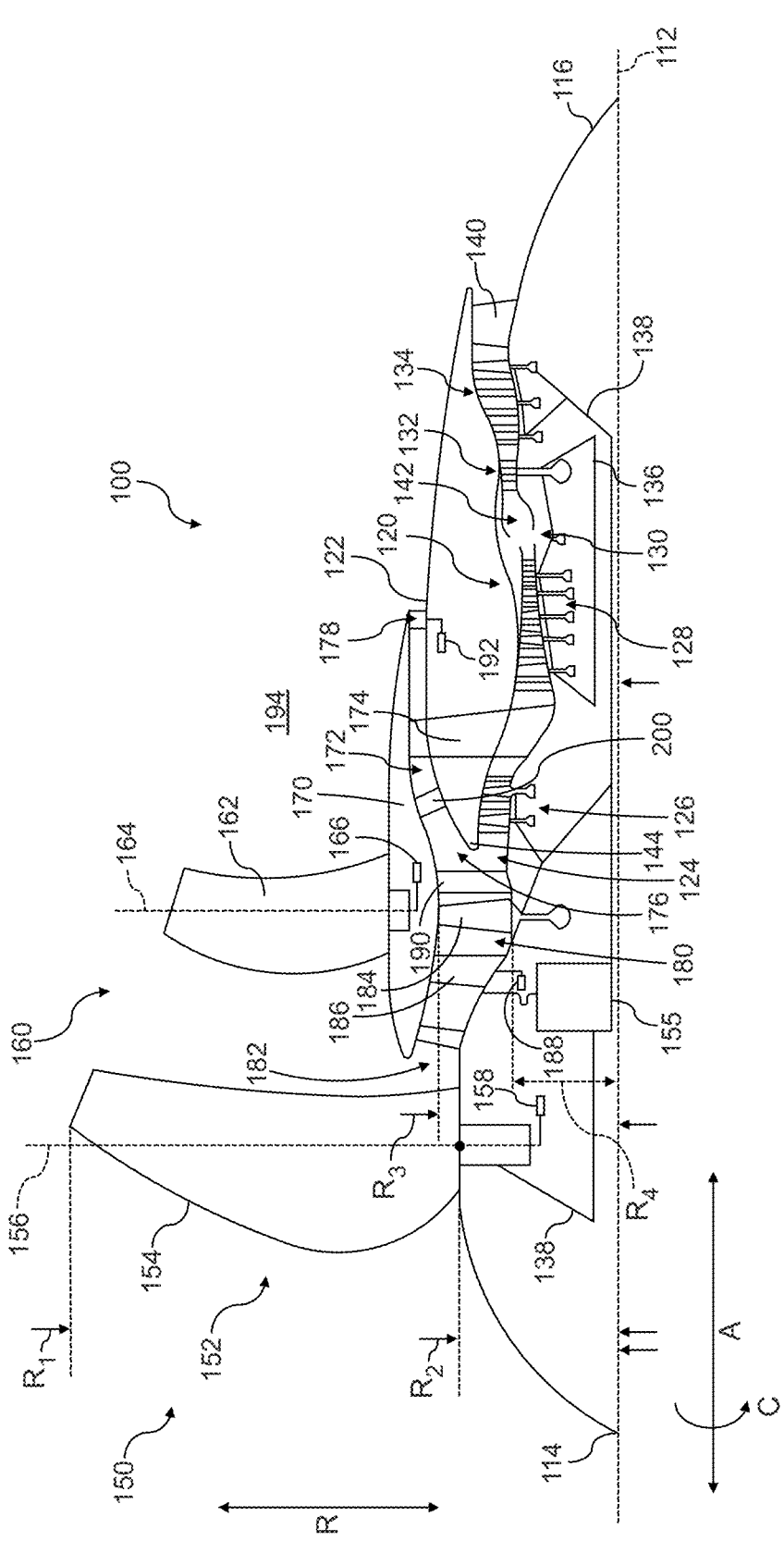
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "bypass passage" refers generally to a passage with an airflow from a fan of the gas turbine engine that flows over an upstream-most inlet to a turbomachine of the gas turbine engine. In a ducted gas turbine engine, the bypass passage is the passage defined between an outer nacelle (surrounding the fan of the gas turbine engine) and one or more cowls inward of the outer nacelle (e.g., a fan cowl, a core cowl or both if both are present; see, e.g., FIGS. 7 through 9). In an unducted gas turbine engine, the bypass passage refers to an open sided passage (i.e., not explicitly defined by structure such as an outer nacelle) where airflow from the fan passes over an upstream-most inlet to the turbomachine (e.g., inlet 182 to inlet duct 180 in FIGS. 1 and 2), defined at least in part by a primary fan outer fan area, which refers to an area defined by an annulus representing a portion of the fan located outward of an inlet splitter at the upstream-most inlet to the turbomachine (e.g., inlet splitter 196 of the fan cowl 170 in the embodiment of FIGS. 1 and 2). An airflow through the bypass passage of a ducted or an unducted engine refers to all of the airflow from the fan that is not provided through the upstream-most inlet to the turbomachine.

The term "disk loading" refers to an average pressure change across a plurality of rotor blades of a rotor assembly, such as the average pressure change across a plurality of fan blades of a fan.

The term "rated speed" refers to an operating condition of an engine whereby the engine is operating in the maximum, full load operating condition that is rated by the manufacturer. For example, in an engine certified by the Federal Aviation Administration ("FAA"), the rated speed refers to a rotation speed of the engine during the highest sustainable and continuous power operation in the certification documents, such as a rotational speed of the gas turbine engine when operating under a maximum continuous operation.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

Generally, an aeronautical gas turbine engine includes a fan to provide a desired amount of thrust without overloading the fan blades (i.e., without increasing a disk loading of the fan blades of the fan beyond a certain threshold), and therefore to maintain a desired overall propulsive efficiency for the gas turbine engine. Conventional gas turbine engine design practice has been to provide an outer nacelle surrounding the fan to provide relatively efficient thrust for the gas turbine engine. Such a configuration, sometimes referred to as a turbofan engine configuration, may generally limit a permissible size of the fan (i.e., a diameter of the fan). However, the inventors of the present disclosure have found that gas turbine engine design is now driving the diameter of the fan higher to provide as much thrust for the gas turbine engine as possible from the fan to improve an overall propulsive efficiency of the gas turbine engine.

By increasing the fan diameter, an installation of the gas turbine engine becomes more difficult. In addition, if an outer nacelle is maintained, the outer nacelle may become weight prohibitive with some larger diameter fans. Further, as the need for gas turbine engines to provide more thrust continues, the thermal demands on the gas turbine engines correspondingly increases.

The inventors of the present disclosure found that for a three stream gas turbine engine having a primary fan and a secondary fan, with the secondary fan being a ducted fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiently for the gas turbine engine, or unexpectedly may in fact increase the overall propulsive efficiency of the gas turbine engine.

The inventors proceeded in the manner of designing a gas turbine engine with given primary fan characteristics, secondary fan characteristics, and turbomachine characteristics; checking the propulsive efficiency of the designed gas turbine engine; redesigning the gas turbine engine with varying primary fan, secondary fan, and turbomachine characteristics; rechecking the propulsive efficiency of the redesigned gas turbine engine; etc. during the design of several different types of gas turbine engines, including the gas turbine engines described below with reference to FIGS. 1 and 6 through 10. During the course of this practice of studying/evaluating various primary fan characteristics, secondary fan characteristics, and turbomachine characteristics considered feasible for best satisfying mission requirements, it was discovered that certain relationships exist between a ratio of an airflow through the bypass passage and the third stream to an airflow through a core duct (referred to hereinbelow as a thrust to power airflow ratio), as well as between a ratio of an airflow through the third steam to the airflow through the core duct (referred to hereinbelow as a core bypass ratio). In particular, the inventors of the present disclosure have found that these ratios can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

Referring now to FIG. 1, a schematic cross-sectional view of a gas turbine engine 100 is provided according to an example embodiment of the present disclosure. Particularly, FIG. 1 provides a gas turbine engine having a rotor assembly with a single stage of unducted rotor blades. In such a manner, the rotor assembly may be referred to herein as an "unducted fan," or the entire engine 100 may be referred to as an "unducted gas turbine engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustor 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Further, each fan blade 154 defines a fan blade tip radius $R_1$ along the radial direction R from the longitudinal axis 112 to the tip, and a hub radius (or inner radius) $R_2$ along the radial direction R from the longitudinal axis 112 to the base of each fan blade 154 (i.e., from the longitudinal axis 112 to a radial location where each fan blade 154 meets a front hub of the gas turbine engine 100 at a leading edge of the respective fan blade 154). As will be appreciated, a distance from the base of each fan blade 154 to a tip of the respective fan blade 154 is referred to as a span of the respective fan blade 154. Further, the fan 152, or rather each fan blade 154 of the fan 152, defines a fan radius ratio, RqR, equal to $R_2$ divided by $R_1$. As the fan 152 is the primary fan of the engine 100, the fan radius ratio, RqR, of the fan 152 may be referred to as the primary fan radius ratio, $RqR_{Prim.\text{-}Fan}$.

Moreover, each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1; see fan blades 185 labeled in FIG. 2) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base of the respective fan blades of the ducted fan 184 (i.e., a location where the respective fan blades of the ducted fan 184 meet an inner flowpath liner at a leading edge of the respective fan blades of the ducted fan 184). As will be appreciated, a distance from the base of each fan blade of the ducted fan 184 to a tip of the respective fan blade is referred to as a span of the respective fan blade. Further, the ducted fan 184, or rather each fan blade of the ducted fan 184, defines a fan radius ratio, RqR, equal to $R_4$ divided by $R_3$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan duct exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan duct exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan duct exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan duct exhaust nozzle 178 may result in a more efficient generation of third stream thrust, $Fn_{3S}$, during one or more engine operating conditions. Further, by introducing a variability in the geometry of the inlet guide vanes 186 and the fan duct exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan duct exhaust nozzle 178.

Figure 2:
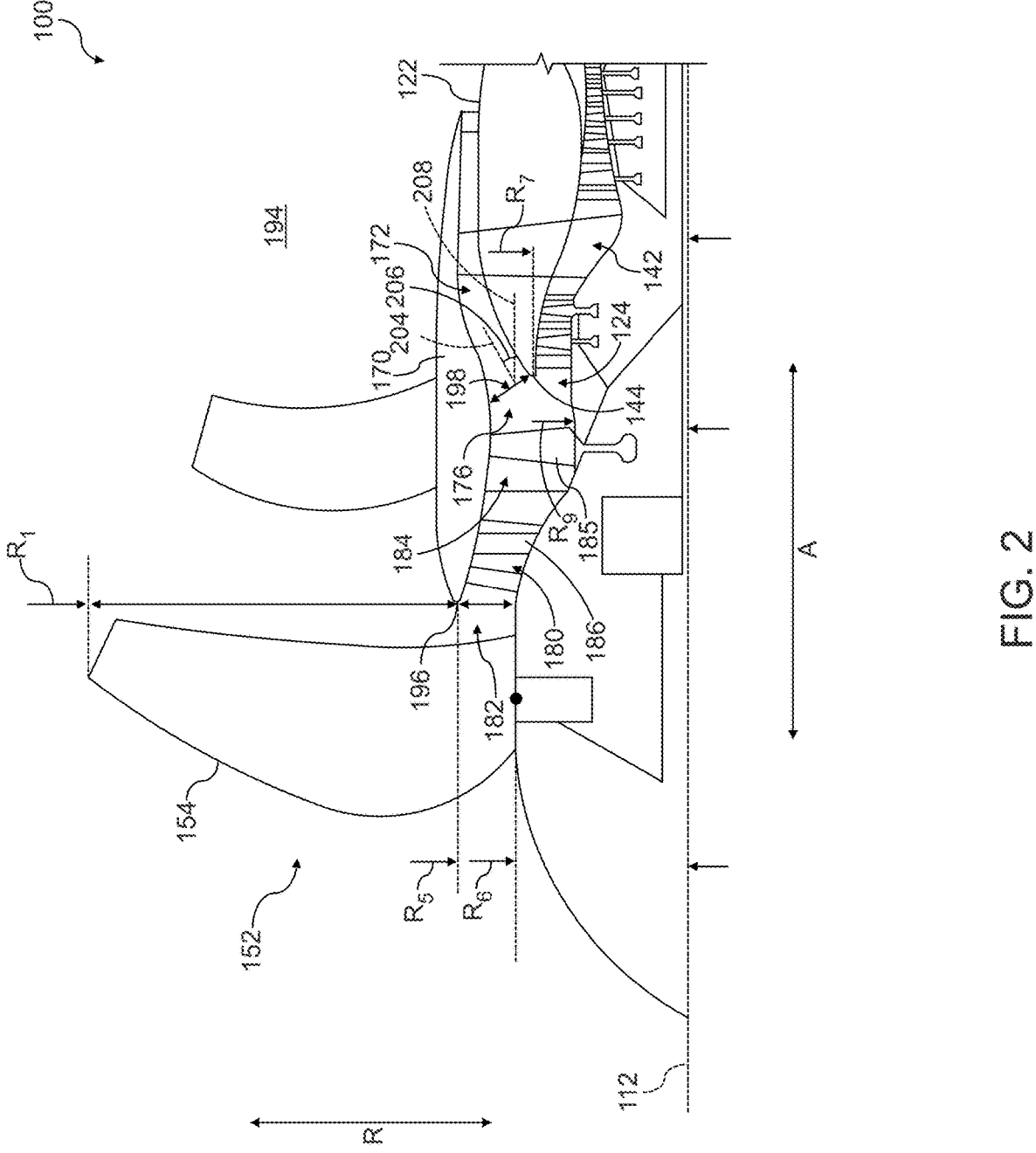
FIG. 2 is a close-up, schematic view of the exemplary three-stream engine of FIG. 1.

Referring now to FIG. 2, a close-up, simplified, schematic view of the gas turbine engine 100 of FIG. 1 is provided. The gas turbine engine 100, as noted above includes a primary fan, or rather fan 152 having fan blades 154, and a secondary fan, or rather ducted fan 184 having fan blades 185. Airflow from the fan 152 is split between a bypass region 194 (as defined below) and the inlet duct 180 by an inlet splitter 196. Airflow from the ducted fan 184 is split between the fan duct 172 and the core duct 142 by the leading edge 144 (sometimes also referred to as a fan duct splitter).

The exemplary gas turbine engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$.

The primary fan outer fan area, $A_{P\_Out}$, refers to an area defined by an annulus representing a portion of the fan 152 located outward of the inlet splitter 196 of the fan cowl 170. In particular, the gas turbine engine 100 further defines a fan cowl splitter radius, $R_5$. The fan cowl splitter radius, $R_5$, is defined along the radial direction R from the longitudinal axis 112 to the inlet splitter 196. The primary fan outer fan area, $A_{P\_Out}$, refers to an area defined by the formula:

$$\pi R_1^2 - \pi R_5^2.$$

The primary fan inner fan area, $A_{P\_In}$, refers to an area defined by an annulus representing a portion of the fan 152 located inward of the inlet splitter 196 of the fan cowl 170. In particular, the gas turbine engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area, $A_{P\_In}$, refers to an area defined by the formula:

$$\pi R_5^2 - \pi R_6^2.$$

The secondary fan outer fan area, $A_{S\_Out}$, refers to an area representing a portion of an airflow from the ducted fan 184 that is provided to the fan duct 172. In particular, the leading edge 144 defines a leading edge radius, $R_7$, and the gas turbine engine 100 defines an effective fan duct inlet outer radius, $R_8$ (see FIG. 3). The leading edge radius, $R_7$, is defined along the radial direction R from the longitudinal axis 112 to the leading edge 144.

Figure 3:
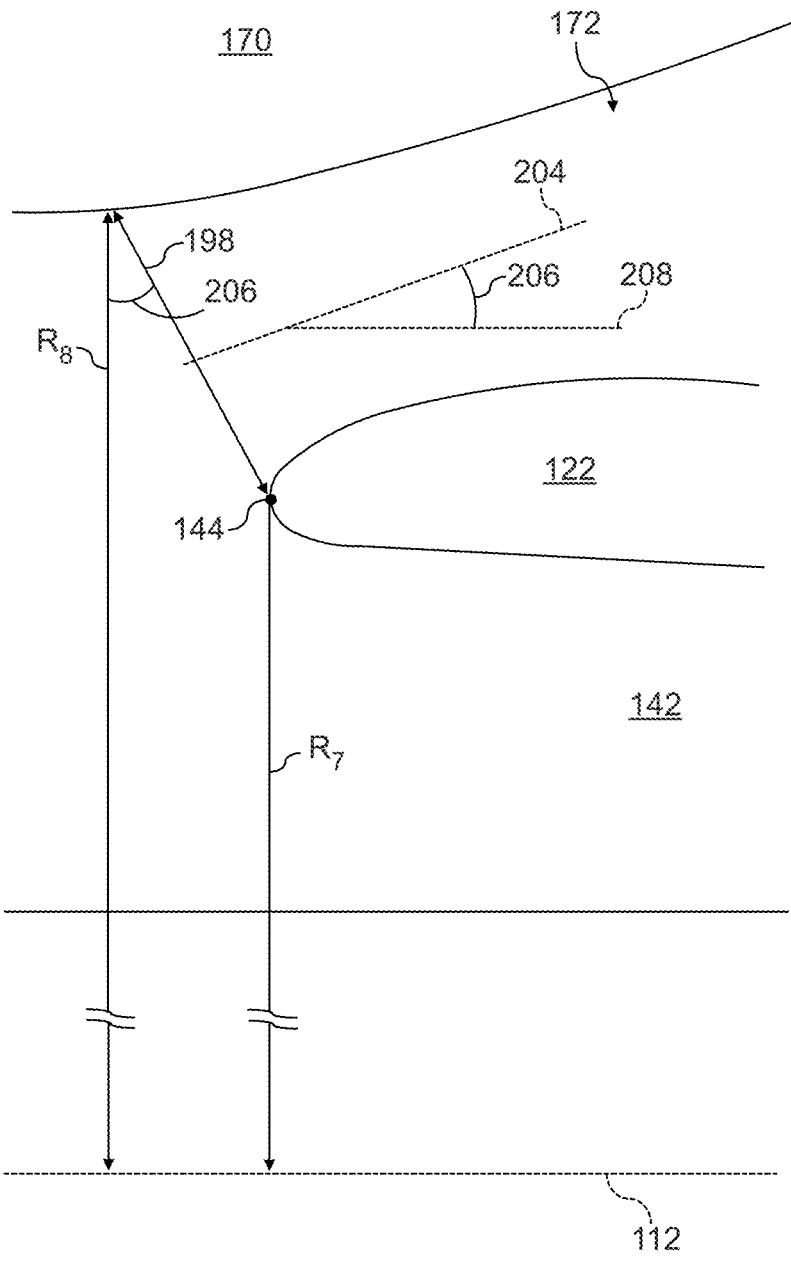
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. An angle 206 is defined by the mean flow direction 204 relative to a reference line 208 extending parallel to the longitudinal axis 112. The angle 206 is referred to as $\theta$. In certain embodiments, the angle 206 may be between 5 degrees and 80 degrees, such as between 10 degrees and 60 degrees (an increased angle is a counterclockwise rotation in FIG. 3). The effective fan duct inlet outer radius, $R_8$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi \left( R_8^2 - R_7^2 \right)}{\cos(\theta)}.$$

Referring back to FIG. 2, the secondary fan inner fan area, $A_{S\_In}$, refers to an area defined by an annulus representing a portion of the ducted fan 184 located inward of the leading edge 144 of the core cowl 122. In particular, the gas turbine engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The secondary fan inner fan area, $A_{S\_In}$, refers to an area defined by the formula:

$$\pi R_7^2 - \pi R_9^2.$$

The primary fan outer fan area, $A_{P\_Out}$, the primary fan inner fan area, $A_{P\_In}$, the secondary fan outer fan area, $A_{S\_Out}$, and the secondary fan inner fan area, $A_{S\_In}$, may be used in defining various airflow ratios for the engine 100. In particular, it will be appreciated that the exemplary engine 100 of FIGS. 1 through 3 further defines a thrust to power airflow ratio and a core bypass ratio, which as discussed herein are used to define an engine in accordance with the present disclosure. The thrust to power airflow ratio is a ratio of an airflow through the bypass passage of the engine 100 and through the fan duct 172 to an airflow through the core duct 142. The bypass passage (not separately labeled) is located within the bypass region 194 and refers to a passage where airflow from the fan 152 passes over the inlet duct 180. Further, the core bypass ratio is a ratio of an airflow through the fan duct 172 to the airflow through the core duct 142. These ratios are calculated while the engine 100 is operating at a rated speed during standard day operating conditions, and the amounts of airflow used to calculate these ratios are each expressed as a mass flowrate in the same units (mass per unit time).

More specifically, the amount of airflow through the engine's bypass passage can be determined using a fan pressure ratio for the fan 152, a rotational speed of the fan 152, or both while the engine is operating at the rated speed during standard day operating conditions, and the primary fan outer fan area, $A_{P\_Out}$. The amount of airflow through the inlet duct 180 can be determined using a fan pressure ratio for the fan 152, a rotational speed of the fan 152, or both while operating at a rated speed during standard day operating conditions, and the primary fan inner fan area, $A_{P\_In}$. The amount of airflow through the fan duct 172 and the amount of airflow through the core duct 142 can be determined based on the amount of airflow through the inlet duct 180 while the engine is operating at the rated speed during standard day operating conditions; a fan pressure ratio, a rotational speed, or both of the ducted fan 184 while the engine is operating at the rated speed during standard day operating conditions; and the secondary fan outer fan area, $A_{S\_Out}$, and the secondary fan inner fan area, $A_{S\_In}$.

As alluded to earlier, the inventors discovered, unexpectedly during the course of gas turbine engine design—i.e., designing gas turbine engines (e.g., both ducted and unducted gas turbine engines and turboprop engines) having a variety of different primary fan and secondary fan characteristics—and evaluating an overall propulsive efficiency, significant relationships exist in a ratio of an airflow through a bypass passage and through a third stream to an airflow through a core duct (referred to herein as a thrust to power airflow ratio), as well as in a ratio of an airflow through the third steam to the airflow through the core duct (referred to herein as a core bypass ratio). These relationships can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, it may generally be desirable to increase a fan diameter in order to provide a higher thrust to power airflow ratio, which typically correlates to a higher overall propulsive efficiency. However, increasing the fan diameter too much may actually result in a decrease in propulsive efficiency at higher speeds due to a drag from the fan blades. Further, increasing the fan diameter too much may also create prohibitively heavy fan blades, creating installation problems due to the resulting forces on the supporting structure (e.g., frames, pylons, etc.), exacerbated by a need to space the engine having such fan blades further from a mounting location on the aircraft to allow the engine to fit, e.g., under/over the wing, adjacent to the fuselage, etc.

Similarly, it may generally be desirable to increase an airflow through the fan duct relative to the core duct in order to provide a higher core bypass ratio, as such may also generally correlate to a higher overall propulsive efficiency. Notably, however, the higher the core bypass ratio, the less airflow provided to the core of the gas turbine engine. For a given amount of power needed to drive, e.g., a primary fan and a secondary fan of the gas turbine engine, if less airflow is provided, either a maximum temperature of the core needs to be increased or a size of the primary fan or secondary fan needs to be decreased. Such a result can lead to either premature wear of the core or a reduction in propulsive efficiency of the gas turbine engine.

As noted above, the inventors of the present disclosure discovered bounding the relationships defined by the thrust to power airflow ratio and core bypass ratio can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$TPAR = (A_B + A_{3S})/A_C \tag{1}$$

$$CBR = A_{3S}/A_C \tag{2}$$

where TPAR is a thrust to power airflow ratio, CBR is a core bypass ratio, $A_B$ is an airflow through a bypass passage of the gas turbine engine while the engine is operated at a rated speed during standard day operating conditions, $A_{3S}$ is an airflow through a third stream of the gas turbine engine while the engine is operated at the rated speed during standard day operating conditions, and $A_C$ is an airflow through a core of the gas turbine engine while the engine is operated at the rated speed during standard day operating conditions. The airflow through the core of the gas turbine engine may refer to an airflow through an upstream end of the core (e.g., an airflow through a first stage of a high pressure compressor of the core). $A_B$, $A_{3S}$, and $A_C$ are each expressed as mass flowrate, with the same units as one another.

Values for various parameters of the influencing characteristics of an engine defined by Expressions (1) and (2) are set forth below in TABLE 1:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as at least 3.7, such as at least 4, such as up to 10, such as up to 7 |
| $RqR_{Sec.\text{-}Fan}$ | Secondary fan radius ratio | 0.2 to 0.9, such as 0.2 to 0.7, such as 0.57 to 0.67 |
| $RqR_{Prim.\text{-}Fan}$ | Primary fan radius ratio | 0.2 to 0.4, such as 0.25 to 0.35 |
| TPAR | Thrust to power airflow ratio | 3.5 to 100, such as 4 to 75 (see also, TABLE 2, below) |
| CBR | Core Bypass Ratio | 0.1 to 10, such as 0.3 to 5 (see also, TABLE 2, below) |

Referring now to FIGS. 4A through 4H and 5A through 5D, the relationships between the various parameters of Expressions (1) and (2) of exemplary gas turbine engines are illustrated in accordance with one or more exemplary embodiments of the present disclosure. In particular, FIGS. 4A through 4H provide a table including numerical values corresponding to several of the plotted gas turbine engines in FIGS. 5A through 5D. FIGS. 5A through 5D are plots of gas turbine engines in accordance with one or more exemplary embodiments of the present disclosure, showing the TPAR (Y-Axis) and the CBR (X-axis). FIGS. 5A through 5D highlight preferred subranges, including subranges for unducted engines, ducted engines, and turboprop engines, as discussed hereinbelow.

Figure 5A:
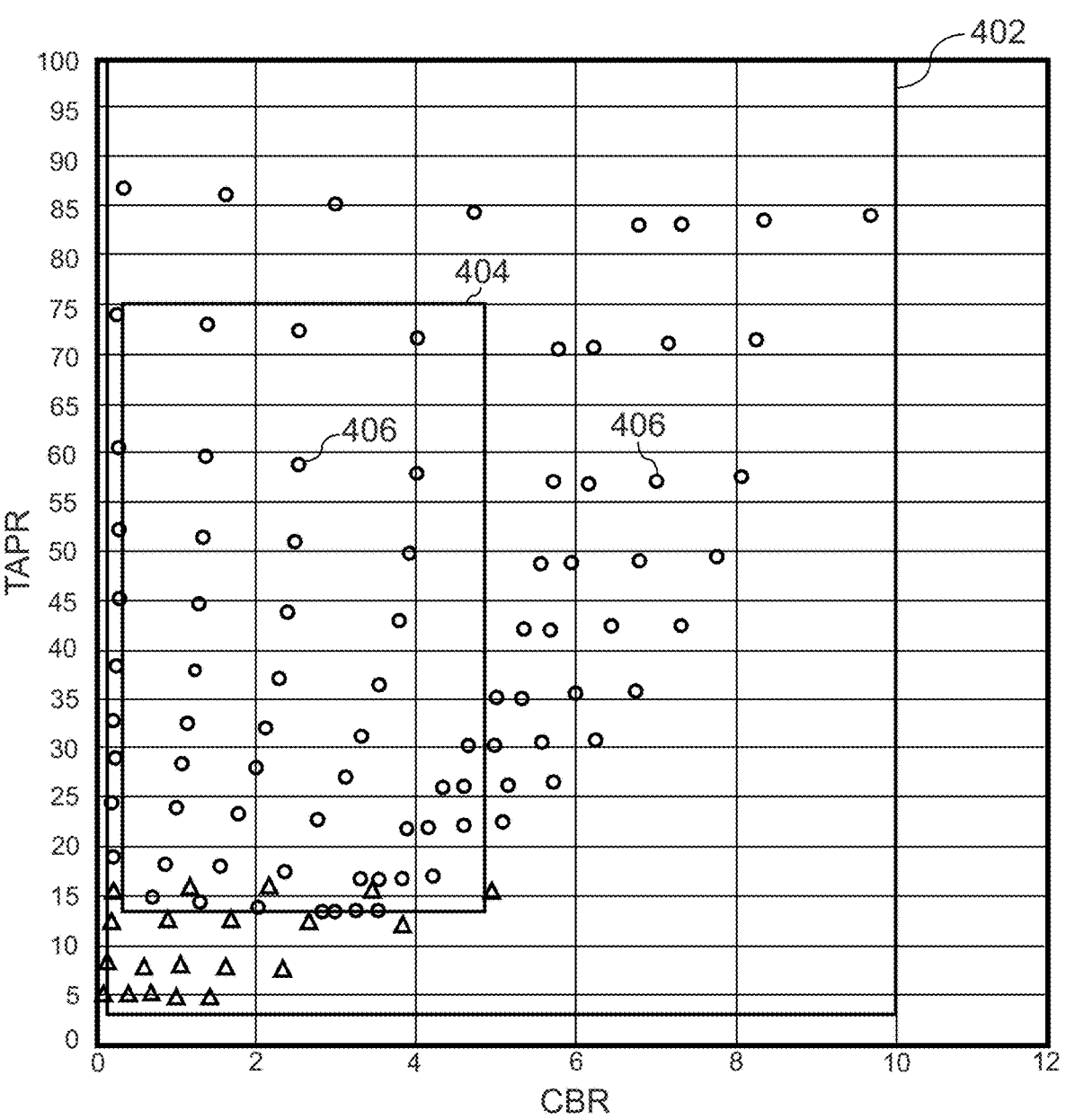
FIGS. 5A through 5D are graphs depicting a range of thrust to power airflow ratios and core bypass ratios in accordance with various example embodiments of the present disclosure.

Referring particularly to FIG. 5A, a first range 402 and a second range 404 are provided, and exemplary embodiments 406 are plotted. The exemplary embodiments 406 include a variety of gas turbine engine types in accordance with aspects of the present disclosure, including unducted gas turbine engines, ducted gas turbine engines (turbofan engines), and turboprop engines. The first range 402 corresponds to a TPAR between 3.5 and 100 and a CBR between 0.1 and 10. The first range 402 captures the benefits of the present disclosure across the variety of engine types. The second range 404 corresponds to a TPAR between 14 and 75 and a CBR between 0.3 and 5. The second range 404 may provide more desirable TPAR and CBR relationships across the variety of engine types to achieve propulsive efficiency, while still providing packaging and weight benefits, thermal benefits, etc.

Figure 5B:
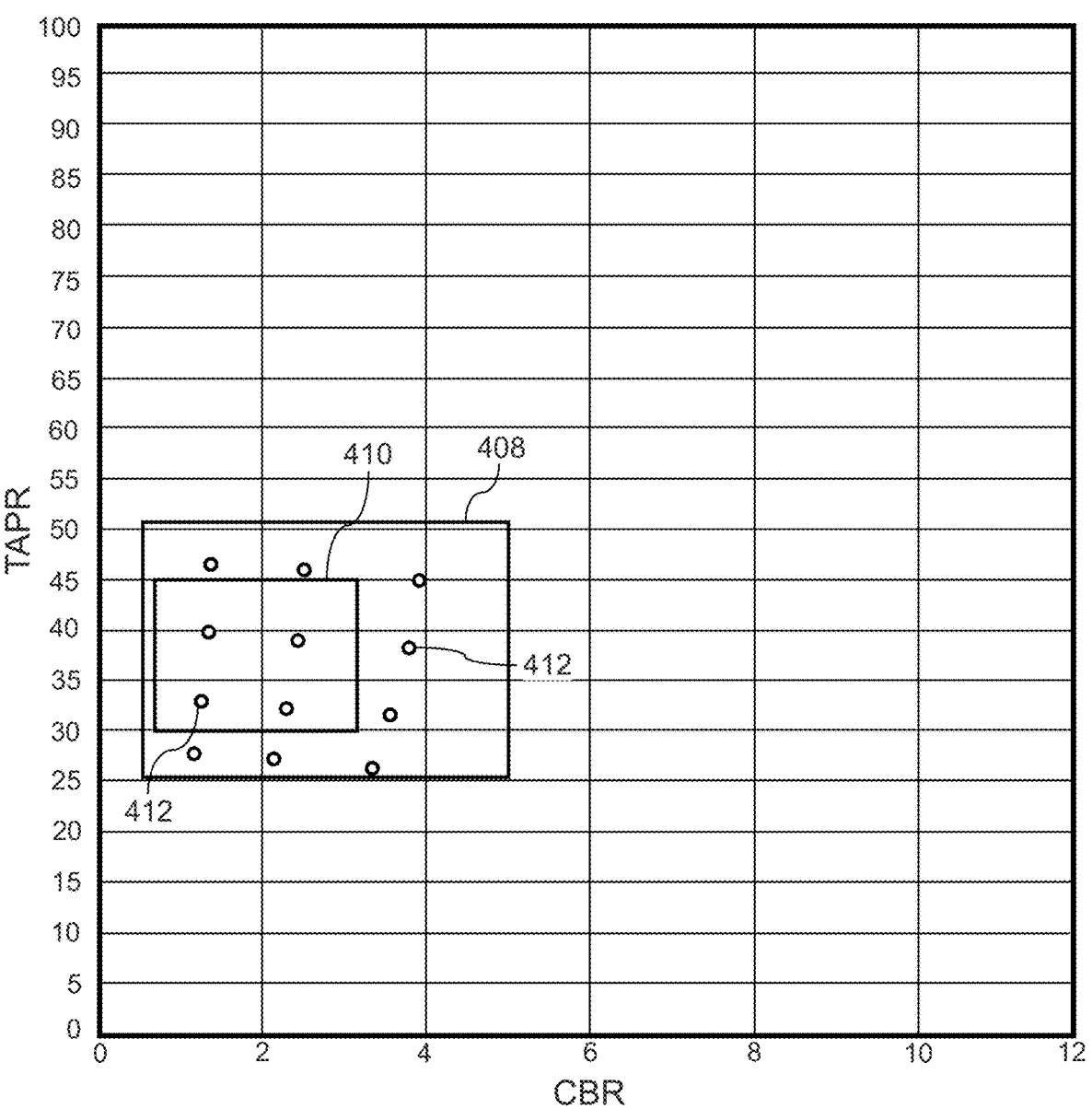

Referring particularly to FIG. 5B, a third range 408 and a fourth range 410 are provided, and exemplary embodiments 412 are plotted. The exemplary embodiments 412 include a variety of unducted gas turbine engines in accordance with aspects of the present disclosure. In particular, the exemplary embodiments 412 include a variety of gas turbine engines having an unducted primary fan, similar to the exemplary embodiments described herein with reference to FIGS. 1 and 10. The third range 408 corresponds to a TPAR between 30 and 56 and a CBR between 0.3 and 5. The third range 408 captures the benefits of the present disclosure for unducted gas turbine engines. The fourth range 410 corresponds to a TPAR between 35 and 50 and a CBR between 0.5 and 3. The fourth range 410 may provide more desirable TPAR and CBR relationships for the unducted gas turbine engines to achieve propulsive efficiency, while still providing packaging and weight benefits, thermal benefits, etc.

As will be appreciated, the unducted gas turbine engines may have, on the whole, a higher TPAR as compared to the ducted gas turbine engines (see FIG. 5C), enabled by a lack of an outer nacelle or other casing surrounding a primary fan. The range of CBR values in the fourth range 410 isn't as large as the range of CBR values in the third range 408, as in the embodiments with a higher TPAR, the CBR needs to be lower to provide a necessary amount of airflow to a core of the engine without exceeding temperature thresholds or requiring an undesired reduction in a size of the primary fan.

The inventors of the present disclosure have found that the TPAR values and CBR values in the third and fourth ranges 408, 410 shown may provide a desirable propulsive benefit, while still enabling operation of the core in a reasonable manner, and balancing installation and thermal load considerations.

Figure 5C:
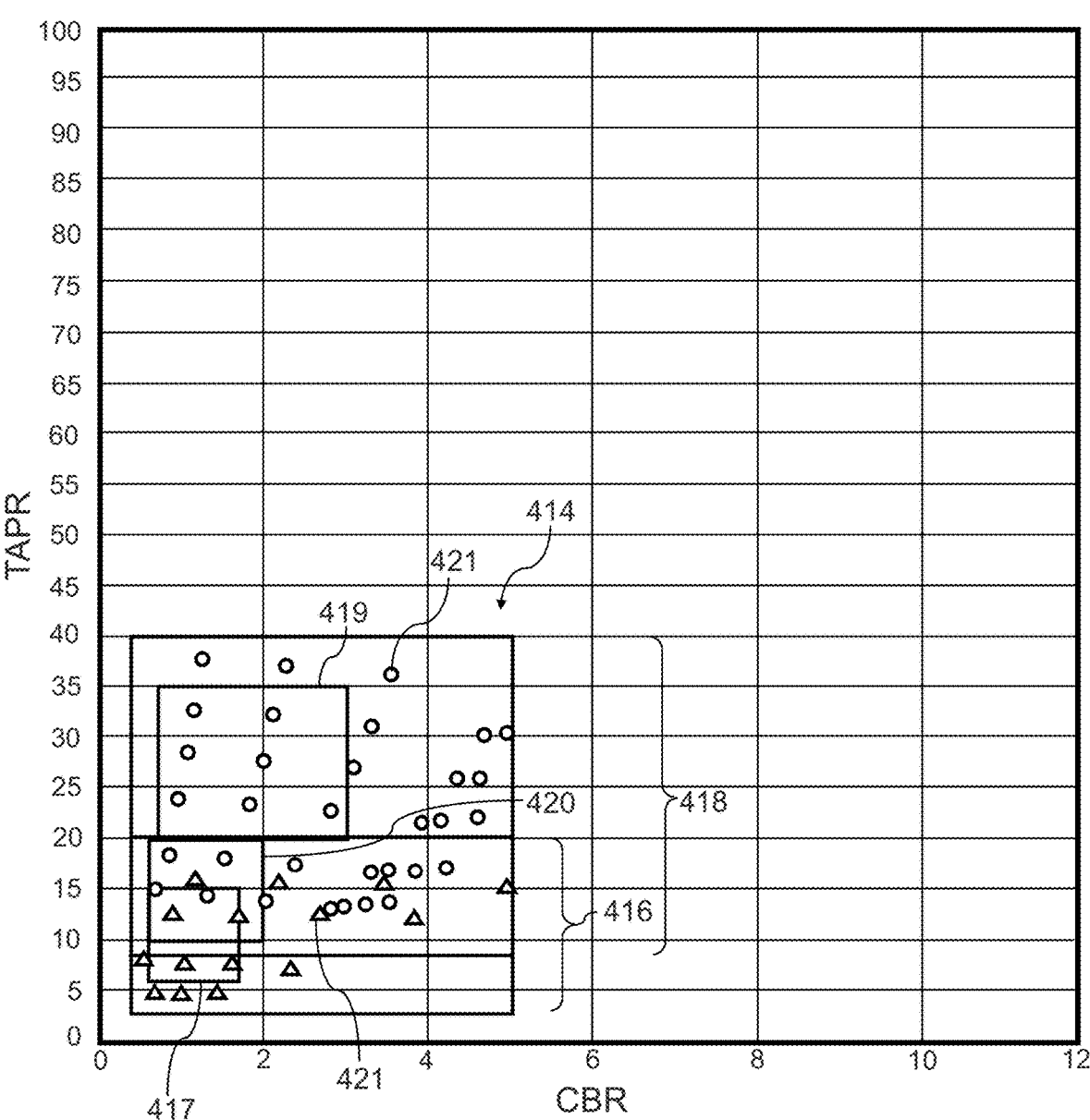

Referring particularly to FIG. 5C, a fifth range 414, a sixth range 416, a seventh range 417, an eighth range 418, a ninth range 419, and a tenth range 420 are provided, and exemplary embodiments 421 are plotted. The exemplary embodiments 421 include a variety of ducted gas turbine engines in accordance with aspects of the present disclosure. In particular, the exemplary embodiments 421 include a variety of gas turbine engines having a ducted primary fan, similar to the exemplary embodiments described herein with reference to FIGS. 7 through 9. The fifth range 414 corresponds to a TPAR between 3.5 and 40 and a CBR between 0.3 and 5. The fifth range 414 captures the benefits of the present disclosure for ducted gas turbine engines.

The sixth range 416 corresponds to a TPAR between 3.5 and 20 and a CBR between 0.2 and 5. The sixth range 416 captures the benefits of the present disclosure for ducted gas turbine engines in a direct drive configuration (see, e.g., FIG. 7). As will be appreciated, with a ducted, direct drive gas turbine engine a primary fan may be smaller, limiting a TPAR. The seventh range 417, which also corresponds to ducted gas turbine engines in a direct drive configuration, corresponds to a TPAR between 6 and 15 and a CBR between 0.3 and 1.8, and may represent a more preferrable range.

The eighth range 418 corresponds to a TPAR between 8 and 40 and a CBR between 0.2 and 5. The eighth range 418 captures the benefits of the present disclosure for ducted gas turbine engines in a geared configuration (see, e.g., FIGS. 8 and 9). As will be appreciated, with a ducted, geared gas turbine engine a primary fan may be larger as compared to a ducted, direct drive gas turbine engine, allowing for a larger TPAR. TPAR is, in turn, limited by an allowable nacelle drag and fan operability.

The ninth range 419 corresponds to ducted gas turbine engines in a geared configuration having a variable pitch primary fan (see FIGS. 8 and 9) and the tenth range 420 corresponds to ducted gas turbine engines in a geared configuration having a fixed pitch primary fan. Inclusion of a variable pitch primary fan may allow for a larger fan, but may also necessitate higher heat rejection abilities for the gas turbine engine, which may, in turn increase a CBR. The ninth range 419 corresponds to a TPAR between 20 and 35 and a CBR between 0.5 and 3, and the tenth range 420 corresponds to a TPAR between 10 and 20 and a CBR between 0.3 and 2. It will be appreciated that in other exemplary aspects, a gas turbine engine of the present disclosure in a ducted, geared, variable pitch configuration may have TPAR between 15 and 40 and a CBR between 0.3 and 5, and a gas turbine engine in a ducted, geared, fixed pitch configuration may have TPAR between 8 and 25 and a CBR between 0.3 and 5.

As will be appreciated, the ducted gas turbine engines may have, on the whole, a lower TPAR than the unducted gas turbine engines as a result of an outer nacelle surrounding a primary fan (the outer nacelle becoming prohibitively heavy with higher diameter primary fans). Further, it will be appreciated that the TPAR values for geared engines may be higher than the TPAR values for direct drive engines, as inclusion of the gearbox allows the primary fan to rotate more slowly than the driving turbine, enabling a comparatively larger primary fan without overloading the primary fan or generating shock losses at a tip of the primary fan. The range of CBR values may generally be relatively high given the relatively low TPAR values (since a relatively high amount of airflow is provided to a secondary fan through an engine inlet when the TPAR values are low), as a necessary amount of airflow to a core of the ducted gas turbine engine may still be provided with a relatively high CBR without exceeding temperature thresholds or requiring a reduction in a size of the primary fan.

The inventors of the present disclosure have found that the TPAR values and CBR values in the fifth, sixth, seventh, eighth, ninth, and tenth ranges 414, 416, 417, 418, 419, 420 shown may provide a desirable propulsive benefit, while still enabling operation of the core in a reasonable manner, and balancing installation and thermal load considerations.

Figure 5D:
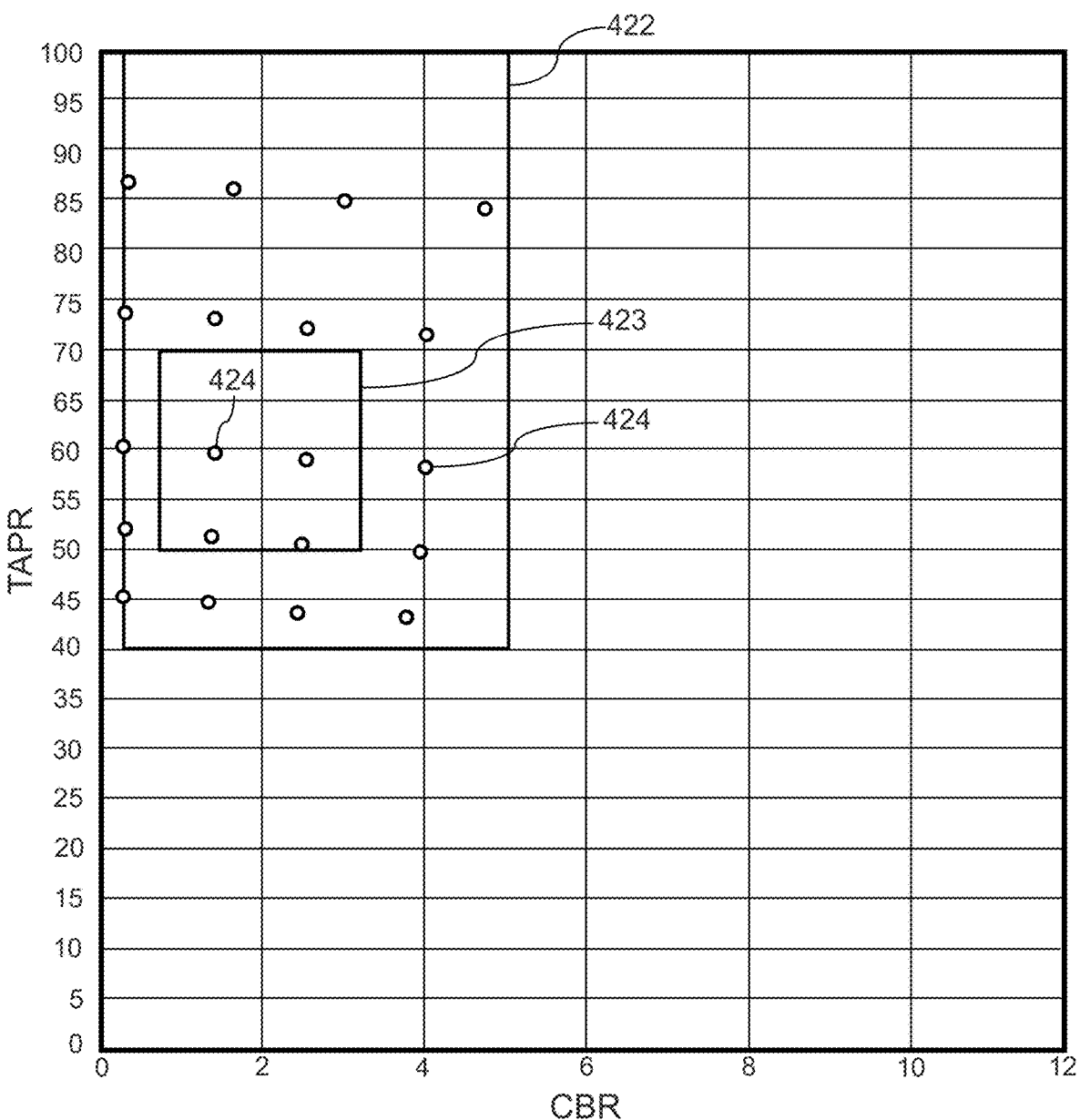

Referring particularly to FIG. 5D, an eleventh range 422 and a twelfth range 423 are provided, and exemplary embodiments 424 are plotted. The exemplary embodiments 424 include a variety of turboprop gas turbine engines in accordance with aspects of the present disclosure. In particular, the exemplary embodiments 424 include a variety of turboprop gas turbine engine similar to the exemplary embodiment described herein with reference to FIG. 6. The eleventh range 422 corresponds to a TPAR between 40 and 100 and a CBR between 0.3 and 5. The eleventh range 422 captures the benefits of the present disclosure for turboprop gas turbine engines. The twelfth range 423 corresponds to a TPAR between 50 and 70 and a CBR between 0.5 and 3, and may represent a more preferrable range.

As will be appreciated, the turboprop gas turbine engines may have, on the whole, higher TPAR values than turbofan engines, enabled by the lack of an outer nacelle or other casing surrounding a primary fan and a relatively slow operational speed of the primary fan and aircraft incorporating the turboprop gas turbine engine. The range of CBR values in the eleventh range 422 and the twelfth range 423 may be relatively small, as less air may be provided through a third stream with such a high TPAR without compromising operation of a core of the gas turbine engine.

The inventors of the present disclosure have found that the TPAR values and CBR values in the eleventh range 422 and twelfth range 423 shown may provide a desirable propulsive benefit, while still enabling operation of the core in a reasonable manner, and balancing installation and thermal load considerations.

TABLE 2, below provides a summary of TPAR values and CBR values for various gas turbine engines in accordance with one or more exemplary aspects of the present disclosure.

TABLE 2

| Engine Type | TPAR Value | CBR Value |
|---|---|---|
| All Aeronautical Gas Turbine Engines ("GTE") | 3.5 to 100 | 0.1 to 10 |
| All Aeronautical GTE | 4 to 75 | 0.3 to 5 |
| Open Rotor GTE | 30 to 60 | 0.3 to 5 |
| Open Rotor GTE | 35 to 50 | 0.5 to 3 |
| Ducted Gas GTE | 3.5 to 40 | 0.2 to 5 |
| Ducted, Geared GTE | 8 to 40 | 0.2 to 5 |
| Ducted, Geared, Variable Pitch GTE | 15 to 40 | 0.3 to 5 |
| Ducted, Geared, Variable Pitch GTE | 20 to 35 | 0.5 to 3 |
| Ducted, Geared, Fixed-Pitch GTE | 8 to 25 | 0.2 to 5 |
| Ducted, Geared, Fixed-Pitch GTE | 10 to 20 | 0.3 to 2 |
| Ducted, Direct Drive GTE | 3.5 to 20 | 0.2 to 5 |
| Ducted, Direct Drive GTE (lower flight speed) | 6 to 20 | 0.2 to 5 |
| Ducted, Direct Drive GTE (lower flight speed) | 8 to 15 | 0.3 to 1.8 |
| Ducted, Direct Drive GTE (higher flight speed) | 3.5 to 10 | 0.2 to 2 |
| Ducted, Direct Drive GTE (higher flight speed) | 3.5 to 6 | 0.3 to 1.5 |
| Turboprop GTE | 40 to 100 | 0.3 to 5 |
| Turboprop GTE | 50 to 70 | 0.5 to 3 |

Figure 6:
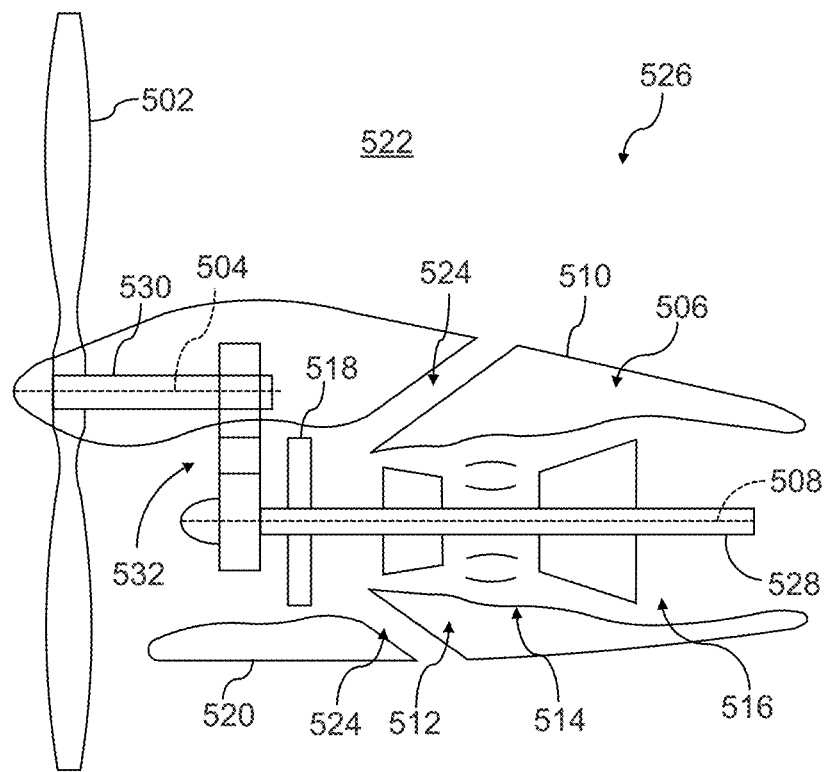
FIG. 6 is a schematic view of a turboprop engine in accordance with an exemplary aspect of the present disclosure.
Figure 7:
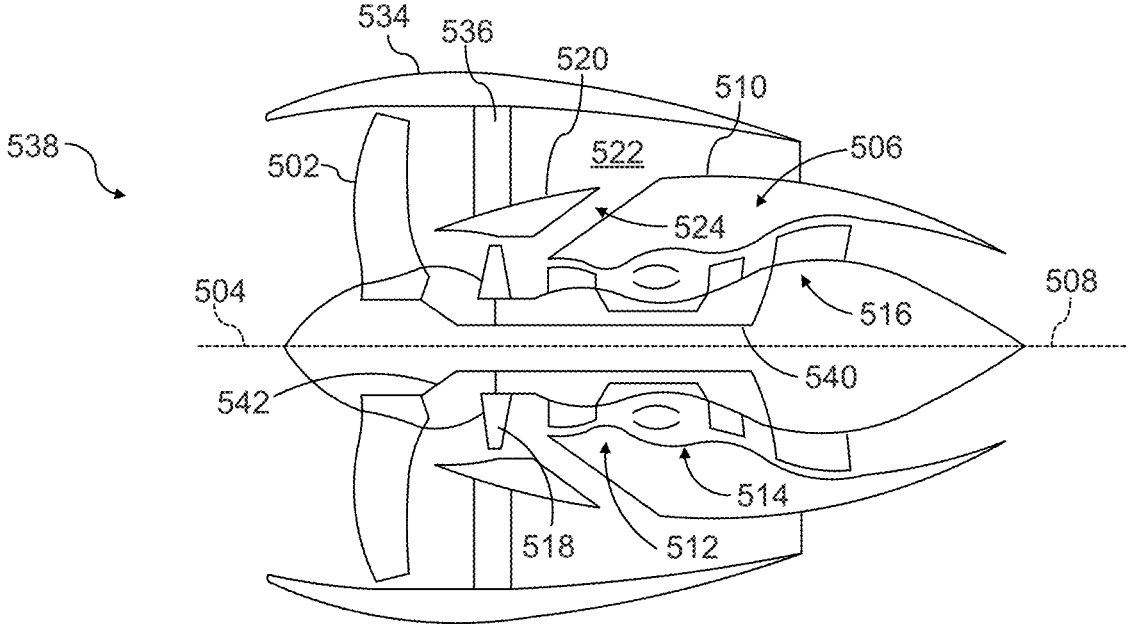
FIG. 7 is a schematic view of a direct drive, ducted, turbofan engine in accordance with an exemplary aspect of the present disclosure.
Figure 8:
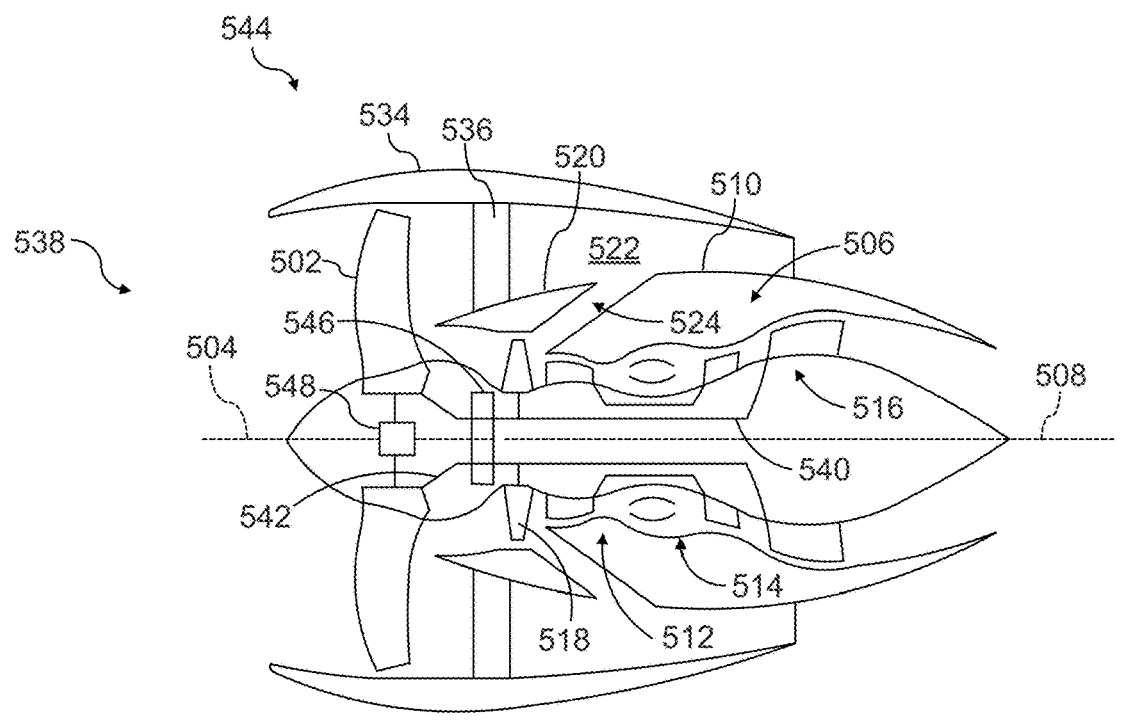
FIG. 8 is a schematic view of a geared, ducted, turbofan engine in accordance with an exemplary aspect of the present disclosure.
Figure 9:
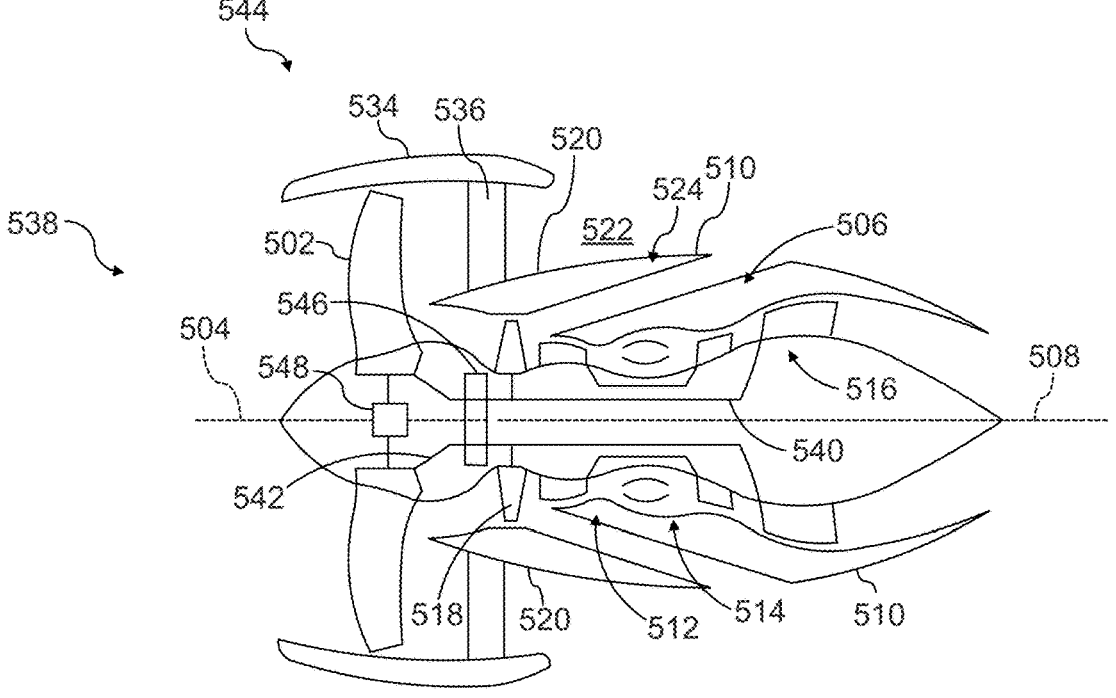
FIG. 9 is a schematic view of a geared, ducted, turbofan engine in accordance with another exemplary aspect of the present disclosure.

For the purposes of Table 2, the term "Ducted" refers to inclusion of an outer nacelle around a primary fan (see, e.g., FIGS. 7 to 9); "Open Rotor" refers to inclusion of an unducted primary fan (see, e.g., FIGS. 1, 10); "Geared" refers to inclusion of a reduction gearbox between the primary fan and a driving turbine (see, e.g., FIGS. 8 to 10); "Direct Drive" refers to exclusion of a reduction gearbox between the primary fan and a driving turbine (see, e.g., FIG. 7); "Variable Pitch" refers to inclusion of a pitch change mechanism for changing a pitch of fan blades on a primary fan (see, e.g., FIGS. 1, 8, 9); "Fixed Pitch" refers to exclusion of a pitch change mechanism for changing a pitch of fan blades on a primary fan (see, e.g., FIGS. 6 to 7); "lower flight speed" refers to an engine designed to operate at a flight speed less than 0.85 Mach; and "higher flight speed" refers to an engine designed to operate at a flight speed higher than 0.85 Mach.

It will be appreciated that although the discussion above is generally relating to the open rotor engine 100 described above with reference to FIGS. 1 and 2, in various embodiments of the present disclosure, the relationships outlined above with respect to, e.g., Expressions (1) and (2) may be applied to any other suitable engine architecture. For example, reference will now be made to FIGS. 6 through 12, each depicting schematically an engine architecture associated with the present disclosure.

Each of the gas turbine engines of FIGS. 6 through 9 generally include a rotor 502 rotatable about a rotor axis 504 and a turbomachine 506 rotatable about a longitudinal axis 508. The rotor 502 corresponds to the "primary fan" described herein. The turbomachine 506 is surrounded at least in part by a core cowl 510 and includes a compressor section 512, a combustion section 514, and a turbine section 516 in serial flow order. In addition to the rotor 502, the gas turbine engines of FIGS. 7 through 9 each also include a ducted mid-fan or secondary fan 518. The gas turbine engines each include a fan cowl 520 surrounding the secondary fan 518.

Referring still to the gas turbine engines of FIGS. 6 through 9, the gas turbine engines each also define a bypass passage 522 downstream of the respective rotor 502 and over the respective fan cowl 520 and core cowl 510, and further define a third stream 524 extending from a location downstream of the respective secondary fan 518 to the respective bypass passage 522 (at least in the embodiments depicted; in other embodiments, the third stream 524 may instead extend to a location downstream of the bypass passage 522).

Referring particularly to FIG. 6, the exemplary gas turbine engine depicted is configured as a turboprop engine 526. In such a manner, the rotor 502 (or primary fan) is configured as a propeller, defining a relatively large diameter. Further, the turboprop engine 526 includes an engine shaft 528 driven by the turbomachine 506, a fan shaft 530 rotatable with the rotor 502, and a gearbox 532 mechanically coupling the engine shaft 528 with the fan shaft 530. The gearbox 532 is an offset gearbox such that the rotor axis 504 is radially offset from the longitudinal axis 508 of the turboprop engine 526.

Notably, in other embodiments of the present disclosure, a turboprop engine may be provided with a reverse flow combustor.

Referring to FIGS. 7 through 9, the gas turbine engines are each configured as turbofan engines, and more specifically as ducted turbofan engines. In such a manner, the gas turbine engines each include an outer nacelle 534 surrounding the rotor 502, and the rotor 502 (or primary fan) of each is therefore configured as a ducted fan. Further, each of the gas turbine engines includes outlet guide vanes 536 extending through the bypass passage 522 to the outer nacelle 534 from the fan cowl 520, the core cowl 510, or both.

More specifically, still, the gas turbine engine of FIG. 7 is configured as a direct drive, ducted, turbofan engine 538. In particular, the direct drive, ducted, turbofan engine 538 includes an engine shaft 540 driven by the turbine section 516 and a fan shaft 542 rotatable with the rotor 502. The fan shaft 542 is configured to rotate directly with (i.e., at the same speed as) the engine shaft 540.

By contrast, the gas turbine engine of FIG. 8 is configured as a geared, ducted, turbofan engine 544. In particular, the geared, ducted, turbofan engine 544 includes the engine shaft 540 driven by the turbine section 516 and the fan shaft 542 rotatable with the rotor 502. However, the exemplary geared, ducted, turbofan engine 544 further includes a gearbox 546 mechanically coupling the engine shaft 540 to the fan shaft 542. The gearbox 546 allows the rotor 502 to rotate at a slower speed than the engine shaft 540, and thus at a slower speed than the secondary fan 518.

Notably, the exemplary geared, ducted, turbofan engine 544 of FIG. 8 further includes a pitch change mechanism 548 operable with the rotor 502 to change a pitch of the rotor blades of the rotor 502. Such may allow for an increased efficiency of the gas turbine engine.

Further, the exemplary gas turbine engine of FIG. 9 is again configured as a direct drive, ducted, turbofan engine 538. However, by contrast to the embodiment of FIG. 8 where a fan duct outlet defined by the fan duct is upstream of a bypass passage outlet defined by the bypass passage, in the embodiment of FIG. 9, the fan duct outlet defined by the fan duct is downstream of the bypass passage outlet defined by the bypass passage.

Moreover, in other exemplary embodiments, other suitable gas turbine engines may be provided. For example, referring now to FIG. 10, a gas turbine engine in accordance with yet another exemplary embodiment of the present disclosure is provided. The exemplary gas turbine engine of FIG. 10 may be configured in a similar manner as the exemplary gas turbine engines described above with reference to FIGS. 7 and 8.

Figure 10:
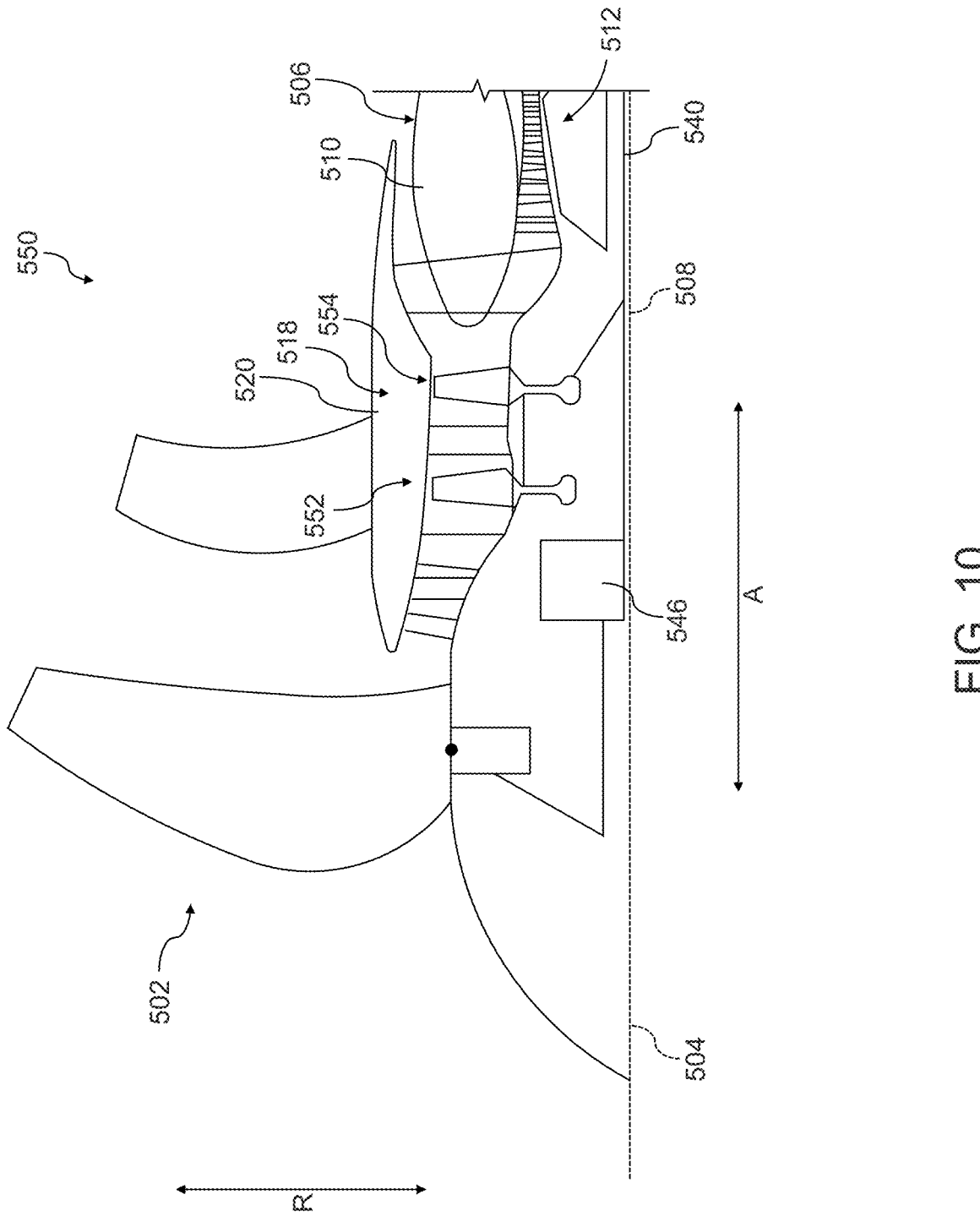
FIG. 10 is a schematic view of an unducted gas turbine engine in accordance with another exemplary aspect of the present disclosure.

For example, the exemplary gas turbine engine of FIG. 10 includes a rotor 502 rotatable about a rotor axis 504 and a turbomachine 506 rotatable about a longitudinal axis 508. The rotor axis 504 and the longitudinal axis 508 are aligned in the embodiment of FIG. 10. The rotor 502 corresponds to the "primary fan" described herein. The turbomachine 506 is surrounded at least in part by a core cowl 510 and includes a compressor section 512 (and, not shown, a combustion section and a turbine section in serial flow order with the compressor section 512). In addition to the rotor 502, the gas turbine engine also includes a ducted mid-fan or secondary fan 518 and a fan cowl 520 surrounding the secondary fan 518.

However, for the embodiment of FIG. 10, the gas turbine engine is configured as an unducted gas turbine engine 550 (see, e.g., FIG. 1), and the secondary fan 518 is not configured as a single stage fan (see fan 184 of FIG. 1). Instead, for the embodiment of FIG. 10, the secondary fan 518 is configured as a multi-stage secondary fan, and more specifically still as a two-stage secondary fan having a total of two stages of rotating compressor rotor blades, and more specifically having a first stage 552 of secondary fan rotor blades and a second stage 554 of secondary fan rotor blades. Notably, with such a configuration, the turbomachine 506 does not include a separate low pressure compressor.

Additionally, in still other exemplary embodiments, the gas turbine engine may have other configurations. For example, referring now to FIG. 11, a gas turbine engine in accordance with yet another exemplary embodiment of the present disclosure is provided. The exemplary gas turbine engine of FIG. 11 may be configured in a similar manner as the exemplary gas turbine engines described above with reference to, e.g., FIGS. 1 through 3.

Figure 11:
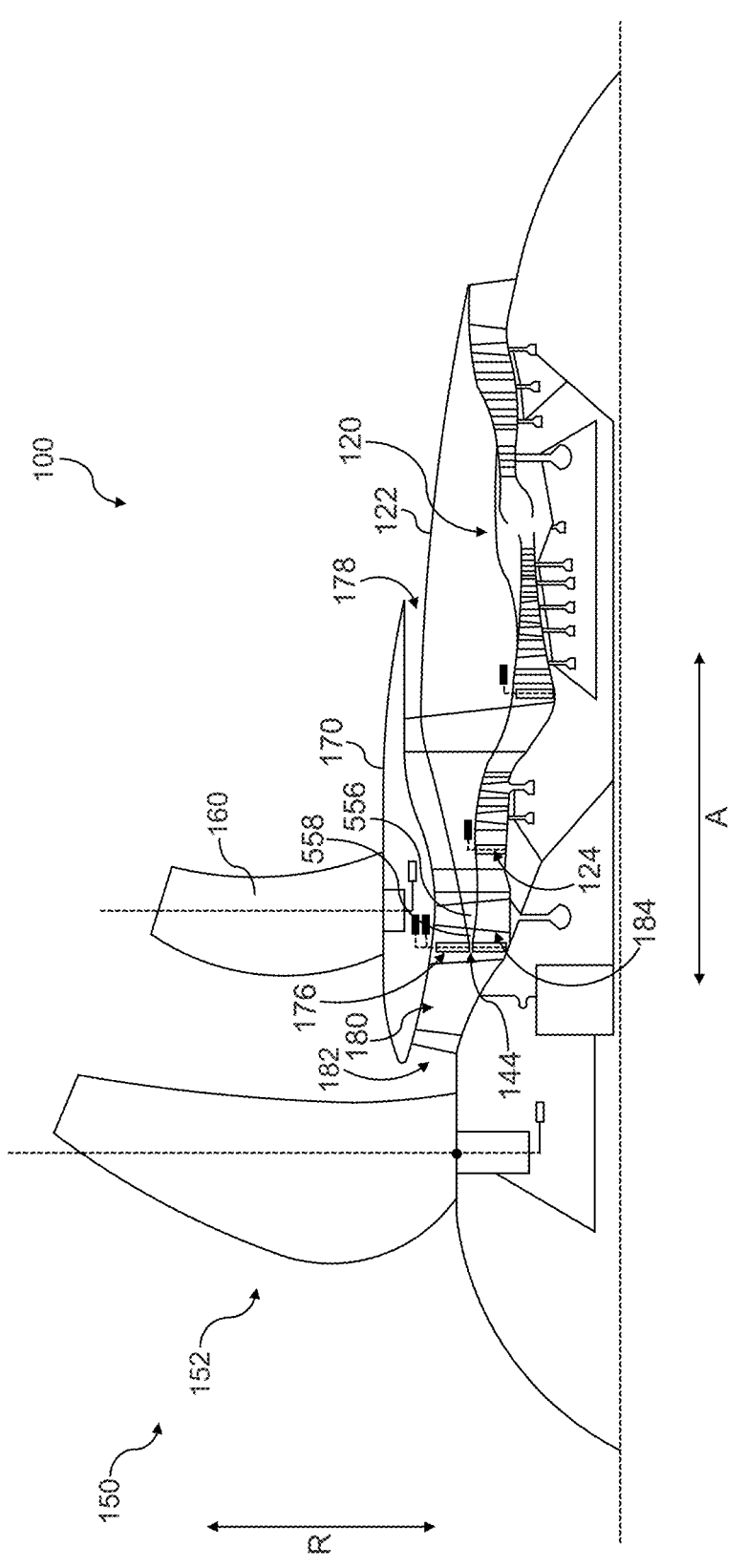
FIG. 11 is a schematic view of an unducted gas turbine engine in accordance with yet another exemplary aspect of the present disclosure.

For example, the exemplary gas turbine engine of FIG. 11 includes a turbomachine 120 and a rotor assembly, also referred to a fan section 150, positioned upstream thereof. The engine 100 further includes a fan cowl 170 and a core cowl 122, the fan cowl 170 annularly encasing at least a portion of the core cowl 122 and generally positioned outward of at least a portion of the core cowl 122 along the radial direction R. Particularly, a downstream section of the fan cowl 170 extends over a forward portion of the core cowl 122 to define a fan duct flowpath, or simply fan duct 172. Incoming air may enter through the fan duct 172 through a fan duct inlet 176 and may exit through a fan duct exhaust nozzle 178 to produce propulsive thrust. The fan duct 172 extends from a leading edge 144 of the core cowl 122.

The engine 100 also defines an inlet duct 180. The inlet duct 180 extends between an engine inlet 182 and a core inlet 124. The engine inlet 182 is defined generally at the forward end of the fan cowl 170 and is positioned between a fan 152 of the fan section 150 and a fan guide vane array 160 along the axial direction A. The engine 100 further includes a ducted fan 184 with a plurality of fan blades located at least partially in the inlet duct 180.

However, for the embodiment of FIG. 11, the core cowl 122 carries forward to an aft edge of the fan blades of the ducted fan 184 and the fan blades themselves include an integral splitter 556. This may be termed a blade-on-blade configuration where inner and outer blades are effectively superimposed upon one another and may be unitarily formed or otherwise fabricated to achieve the split between streams.

The core cowl 122 further includes a section 558 extending forward past the fan blades of the ducted fan 184, such that the leading edge 144 is located forward of the fan blades of the ducted fan 184. With such an arrangement, the fan duct inlet 176 is also located forward of the fan blades of the ducted fan 184, and an outer portion of the fan blades along the radial direction R is positioned within the fan duct 172.

With this configuration, a secondary fan outer fan area, $A_{S\_Out}$, may be calculated at the fan duct inlet 176 in the same manner discussed above with reference to, e.g., FIGS. 2 and 3.

Further, with such a configuration, the secondary fan inner fan area, $A_{S\_In}$, still refers to an area defined by an annulus representing a portion of the ducted fan 184 located inward of the leading edge 144 of the core cowl 122. However, a calculation of the secondary fan inner fan area, $A_{S\_In}$, is based on a leading edge radius, $R_7$, of the leading edge 144 and an inner fan duct radius, defined along the radial direction R, directly inward along the radial direction R from the leading edge 144 (and not a core inlet inner radius at the core inlet 124).

Further, still, in other exemplary embodiments, other engine configurations may be provided. For example, referring now to FIG. 12, an engine 100 in accordance with another embodiment of the present disclosure is provided. The engine 100 of FIG. 12 may be configured in a similar manner as the exemplary engine 100 of, e.g., FIGS. 1 through 3.

Figure 12:
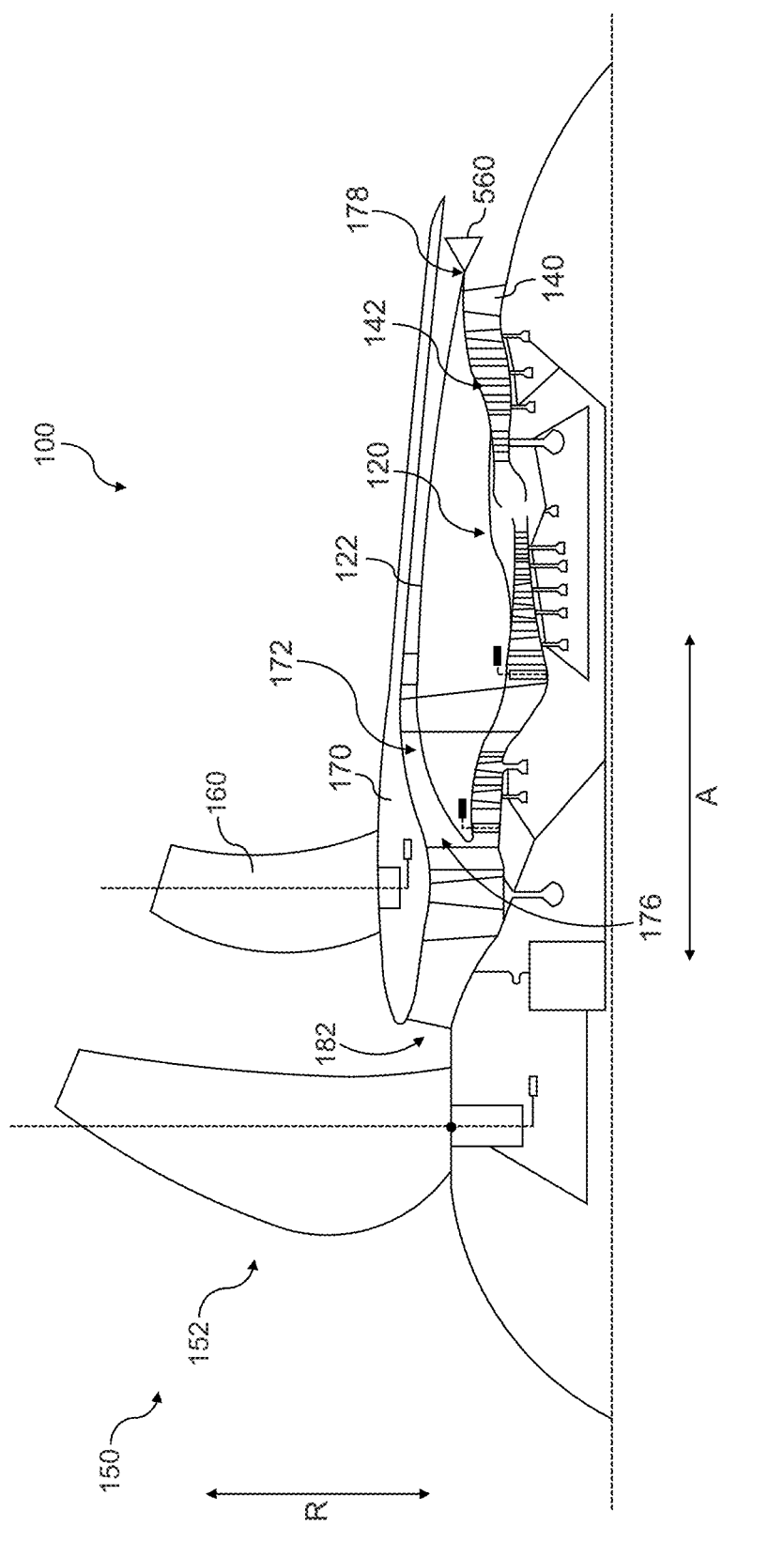
FIG. 12 is a schematic view of an unducted gas turbine engine in accordance with still another exemplary aspect of the present disclosure.

For example, the exemplary gas turbine engine of FIG. 12 includes a turbomachine 120 and a rotor assembly, also referred to as a fan section 150, positioned upstream thereof. The engine 100 further includes a fan cowl 170 and a core cowl 122, the fan cowl 170 annularly encasing at least a portion of the core cowl 122 and generally positioned outward of at least a portion of the core cowl 122 along the radial direction R. Particularly, a downstream section of the fan cowl 170 extends over a forward portion of the core cowl 122 to define a fan duct flowpath, or simply fan duct 172. Incoming air may enter through the fan duct 172 through a fan duct inlet 176 and may exit through a fan duct exhaust nozzle 178 to produce propulsive thrust. The fan duct 172 extends from a leading edge 144 of the core cowl 122.

However, for the embodiment of FIG. 12, the fan duct 172 of the exemplary engine 100 is an elongated fan duct 172 extending between the fan cowl 170 and the core cowl 122, a full length of the core cowl 122. With such a configuration, the fan duct exhaust nozzle 178 is downstream of an exhaust nozzle 140 of the turbomachine 120. The engine 100 of FIG. 12 further includes a mixing device 560 in the region aft of the exhaust nozzle 140 to aid in mixing airflow from the fan duct 172 and from a working gas flowpath 142 of the turbomachine 120, e.g., to improve acoustic performance by directing airflow from the working gas flowpath 142 of the turbomachine 120 outward and from the fan duct 172 inward. Mixing in such a manner may improve performance and noise emissions.

Moreover, in other exemplary embodiments of the present disclosure, a gas turbine engine may have still other suitable configurations. For example, in other embodiments, the gas turbine engine may include any suitable number of shafts or spools, compressors, or turbines (e.g., the gas turbine engine may be a three-spool engine having three turbines and associated spools).

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 12. The method includes operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5. For the exemplary method, the thrust to power airflow ratio is a ratio of an airflow through a bypass passage over a turbomachine of the gas turbine engine plus an airflow through a fan duct to an airflow through a core duct, and the core bypass ratio is a ratio of the airflow through the fan duct to the airflow through the core duct.

As will be appreciated from the description herein, various embodiments of a gas turbine engine are provided. Certain of these embodiments may be an unducted, single rotor gas turbine engine (see FIGS. 1 and 2, 11, and 12), a turboprop engine (see FIG. 6), or a ducted turbofan engine (see FIGS. 7 through 9). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.0 to 4.5, within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

In various exemplary aspects of the present disclosure, a three-stream gas turbine engine is provided, with a "variable bleed valve" (VBV) system. During operation of a turbomachine of the gas turbine engine, a compressor section can require a booster (or low pressure compressor) to have a portion of a flow therefrom bled off using the VBV system to improve performance, maintain operability, etc. This may be required at low power conditions, such as idle, during transient operating condition, such as climb, or both. This flow is referred to herein as VBV flow.

In certain embodiments, a gas turbine engine can exhaust VBV flow into a fan duct (also referred to as a third stream) of the three stream gas turbine engine given a proximity of the third stream to a location from which compressor flow is bled through the VBV system. As will be appreciated, however, the VBV flow can be at a relatively high pressure compared to the flow through the fan duct, given that the VBV flow is bled from downstream of the booster. Accordingly, providing the VBV flow to the fan duct can create a blockage in the fan duct, flow separation, or the like, reducing a flow across a heat exchanger in the fan duct, and e.g., a thrust produced by the fan duct. Notably, operating conditions in which the VBV system operates (e.g., transient operating conditions), can be important operating conditions for the fan duct to operate effectively, and in particular, can be important operating conditions for the heat exchanger within the fan duct to effectively transfer heat to the flow through the fan duct.

The inventors of the present disclosure found that the integration of a dedicated VBV exhaust system that exhausts VBV flow to an alternate location, such as a fan stream or bypass passage, with the three-stream gas turbine engine architecture can allow for the benefits associated with the VBV system to be realized, without negatively impacting the improved operability associated with a three-stream gas turbine engine provided by a flow through the fan duct. A potentially higher weight of the VBV system is surprisingly offset by the efficiency gains in the fan duct.

Furthermore, a dedicated VBV system complements the thrust to power airflow ratio (TPAR) and core bypass ratio (CBR) parameters discussed hereinabove. By providing the VBV flow through a separate exhaust pathway, the gas turbine engine can maintain its designed TPAR and CBR values, which enable achieving high propulsive efficiency and effective thermal management. This integration thus supports the gas turbine engine's ability to meet specific mission requirements with greater reliability and performance consistency. Overall, the combination of the dedicated VBV exhaust system with the three-stream engine architecture results in a more robust and efficient gas turbine engine.

Figure 13:
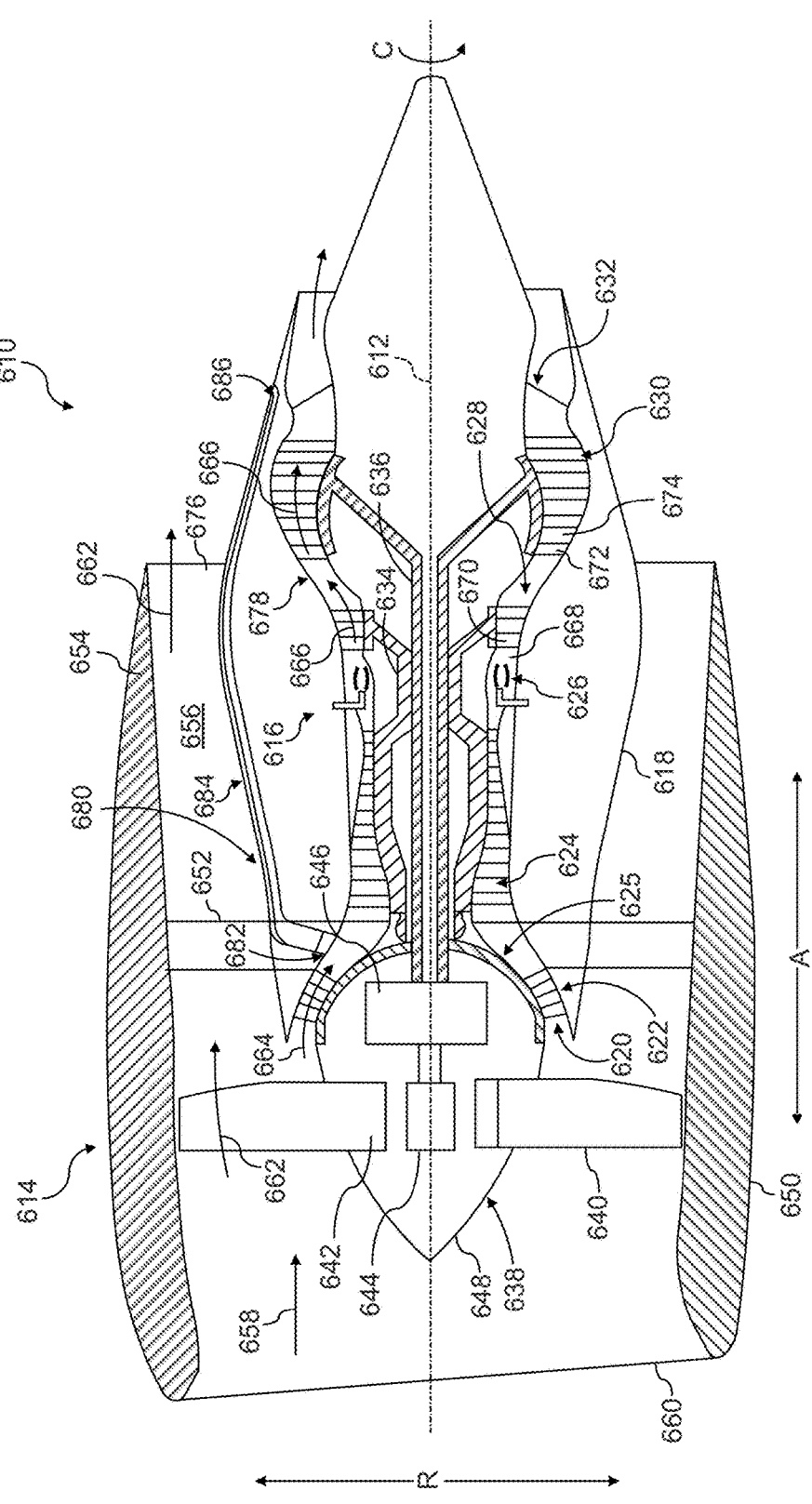
FIG. 13 is a schematic view of an exemplary gas turbine engine.

Referring now to FIG. 13, a schematic cross-sectional view of a gas turbine engine in accordance with another exemplary embodiment of the present disclosure. The exemplary embodiment of FIG. 13 may be configured in a similar manner as the exemplary gas turbine engine 100 described above with respect to FIG. 1. Similar numbers in FIGS. 1 and 13 may refer to similar parts.

However, for the embodiment of FIG. 13, the gas turbine engine is a high-bypass turbofan jet engine, sometimes also referred to as a "turbofan engine." As shown in FIG. 13, the gas turbine engine 610 defines an axial direction A (extending parallel to a longitudinal centerline 612 provided for reference), a radial direction R, and a circumferential direction C extending about the longitudinal centerline 612. In general, the gas turbine engine 610 includes a fan section 614 and a turbomachine 616 disposed downstream from the fan section 614.

The exemplary turbomachine 616 depicted generally includes a substantially tubular outer casing 618 that defines an annular inlet 620. The outer casing 618 encases, in serial flow relationship, a compressor section including a booster or low pressure (LP) compressor 622, a high pressure (HP) compressor 624, and a core duct 625 between the LP compressor 622 and the HP compressor 624; a combustion section 626; a turbine section including a high pressure (HP) turbine 628 and a low pressure (LP) turbine 630; and a turbomachine exhaust nozzle 632. A high pressure (HP) shaft 634 (which may additionally or alternatively be a spool) drivingly connects the HP turbine 628 to the HP compressor 624. A low pressure (LP) shaft 636 (which may additionally or alternatively be a spool) drivingly connects the LP turbine 630 to the LP compressor 622. The compressor section, combustion section 626, turbine section, and turbomachine exhaust nozzle 632 together define a working gas flowpath 637.

For the embodiment depicted, the fan section 614 includes a fan 638 having a plurality of fan blades 640 coupled to a disk 642 in a spaced apart manner. As depicted, the fan blades 640 extend outwardly from disk 642 generally along the radial direction R. Each fan blade 640 is rotatable relative to the disk 642 about a pitch axis P by virtue of the fan blades 640 being operatively coupled to a suitable pitch change mechanism 644 configured to collectively vary the pitch of the fan blades 640, e.g., in unison. The gas turbine engine 610 further includes a power gear box 646, and the fan blades 640, disk 642, and pitch change mechanism 644 are together rotatable about the longitudinal centerline 612 by LP shaft 636 across the power gear box 646. The power gear box 646 includes a plurality of gears for adjusting a rotational speed of the fan 638 relative to a rotational speed of the LP shaft 636, such that the fan 638 may rotate at a more efficient fan speed.

Referring still to the exemplary embodiment of FIG. 13, the disk 642 is covered by rotatable front hub 648 of the fan section 614 (sometimes also referred to as a "spinner"). The front hub 648 aerodynamically contoured to promote an airflow through the plurality of fan blades 640.

Additionally, the exemplary fan section 614 includes an annular fan casing or outer nacelle 650 that circumferentially surrounds the fan 638 and/or at least a portion of the turbomachine 616. It should be appreciated that the nacelle 650 is supported relative to the turbomachine 616 by a plurality of circumferentially-spaced outlet guide vanes 652 in the embodiment depicted. Moreover, a downstream section 654 of the nacelle 650 extends over an outer portion of the turbomachine 616 so as to define a bypass airflow passage 656 therebetween.

During operation of the gas turbine engine 10, a volume of air 658 enters the gas turbine engine 10 through an associated inlet 660 of the nacelle 650 and fan section 614. As the volume of air 658 passes across the fan blades 640, a first portion 662 of air is directed or routed into the bypass airflow passage 656 and a second portion 664 of air as indicated by an arrow is directed or routed into the working gas flowpath 637, or more specifically into the LP compressor 622. The ratio between the first portion 662 of air and the second portion 664 of air is commonly known as a bypass ratio. A pressure of the second portion 664 of air is then increased as it is routed through the HP compressor 624 and into the combustion section 626, where it is mixed with fuel and burned to provide combustion gases 666.

The combustion gases 666 are routed through the HP turbine 628 where a portion of thermal and/or kinetic energy from the combustion gases 666 is extracted via sequential stages of HP turbine stator vanes 668 that are coupled to the outer casing 618 and HP turbine rotor blades 670 that are coupled to the HP shaft 634, thus causing the HP shaft 634 to rotate, thereby supporting operation of the HP compressor 624. The combustion gases 666 are then routed through the LP turbine 630 where a second portion of thermal and kinetic energy is extracted from the combustion gases 666 via sequential stages of LP turbine stator vanes 672 that are coupled to the outer casing 618 and LP turbine rotor blades 674 that are coupled to the LP shaft 636, thus causing the LP shaft 636 to rotate, thereby supporting operation of the LP compressor 622 and/or rotation of the fan 638.

The combustion gases 666 are subsequently routed through the turbomachine exhaust nozzle 632 of the turbomachine 616 to provide propulsive thrust. Simultaneously, the pressure of the first portion 662 of air is substantially increased as the first portion 662 of air is routed through the bypass airflow passage 656 before it is exhausted from a fan duct exhaust nozzle 676 of the gas turbine engine 610, also providing propulsive thrust. The HP turbine 628, the LP turbine 630, and the turbomachine exhaust nozzle 632 at least partially define a hot gas path 678 for routing the combustion gases 666 through the turbomachine 616.

The engine 610 includes a bleed valve system 680. The bleed valve system 680 bleeds air from the turbomachine 616 between the LP compressor 622 and the HP compressor 624. That is, during operation of the gas turbine engine 610, more air may be compressed by the LP compressor 622 than the HP compressor 624 may compress, resulting in reduced performance by the turbomachine 616. Allowing some of the air to be removed from the core duct 625 between the LP compressor 622 and the HP compressor 624 (i.e., "bleeding" the air) allows the HP compressor 624 to operate more stably and efficiently. The bleed valve system 680 includes a bleed valve 682, a bleed valve exhaust duct 684 fluidly connected to the bleed valve 682, and a bleed valve exhaust nozzle 686 fluidly connected to the bleed valve exhaust duct 684. In some contexts, the bleed valve system 680 may be referred to as a "variable" bleed valve (VBV) system, where the amount of air bled from the core duct 625 can vary or be controlled.

It should be appreciated, however, that the exemplary gas turbine engine 610 depicted in FIG. 13 is by way of example only, and that in other exemplary embodiments, the gas turbine engine 610 may have any other suitable configuration. For example, although the gas turbine engine 610 depicted is configured as a ducted gas turbine engine (i.e., including the outer nacelle 650), in other embodiments, the gas turbine engine 610 may be an unducted gas turbine engine (such that the fan 638 is an unducted fan, and the outlet guide vanes 652 are cantilevered from the outer casing 618).

Additionally, or alternatively, although the gas turbine engine 610 depicted is configured as a geared gas turbine engine (i.e., including the power gear box 646) and a variable pitch gas turbine engine (i.e., including a fan 638 configured as a variable pitch fan), in other embodiments, the gas turbine engine 610 may additionally or alternatively be configured as a direct drive gas turbine engine (such that the LP shaft 636 rotates at the same speed as the fan 638), as a fixed pitch gas turbine engine (such that the fan 638 includes fan blades 640 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 14:
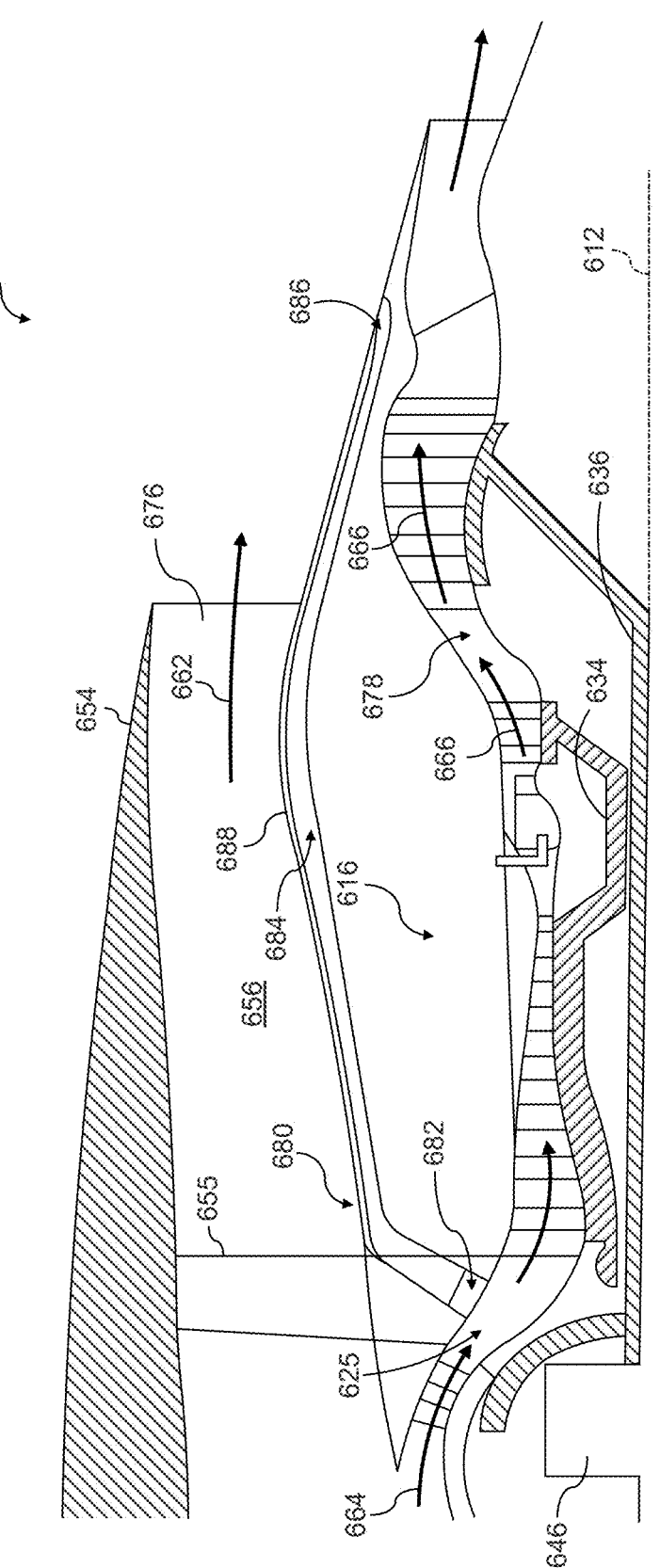
FIG. 14 is a magnified view of the exemplary gas turbine engine of FIG. 13 illustrating a bleed valve system.

Now referring to FIG. 14, a magnified view of the gas turbine engine 610 is shown illustrating the bleed valve system 680. The bleed valve 682 receives air from the core duct 625 and transmits the air to the bleed valve exhaust duct 684. The bleed valve 682 may be any suitable type, such as a rotating door, a sliding door, a solenoid, or combinations thereof. The bleed valve exhaust duct 684 extends along an outer surface 688 of the outer casing 618, transmitting air away from the core duct 625.

The bleed valve exhaust nozzle 686 allows air to flow from the bleed valve exhaust duct 684 out of the turbomachine 616. To prevent air from the bleed valve exhaust duct 684 from mixing with air from other parts of the turbomachine 616, the bleed valve exhaust duct 684 and the bleed valve exhaust nozzle 686 are fluidly separated from the turbomachine exhaust nozzle 632 and the fan duct exhaust nozzle 676. As used herein, the term "fluidly separated", in the context of "A" being fluidly separated from "B", refers to A not receiving a fluid flow from B and B not receiving an airflow from A during an active operating condition of A.

In particular, the bleed valve exhaust nozzle 686 is downstream of the fan duct exhaust nozzle 676 to allow the first portion 662 of air to exit the downstream section 654 of the gas turbine engine 610. The bleed valve exhaust nozzle 686 may be fluidly isolated from the turbomachine exhaust nozzle 632 and the fan duct exhaust nozzle 676, such that no air from the bleed valve exhaust duct 684 mixes with air from the bypass airflow passage 656 or the turbine section.

Figure 15:
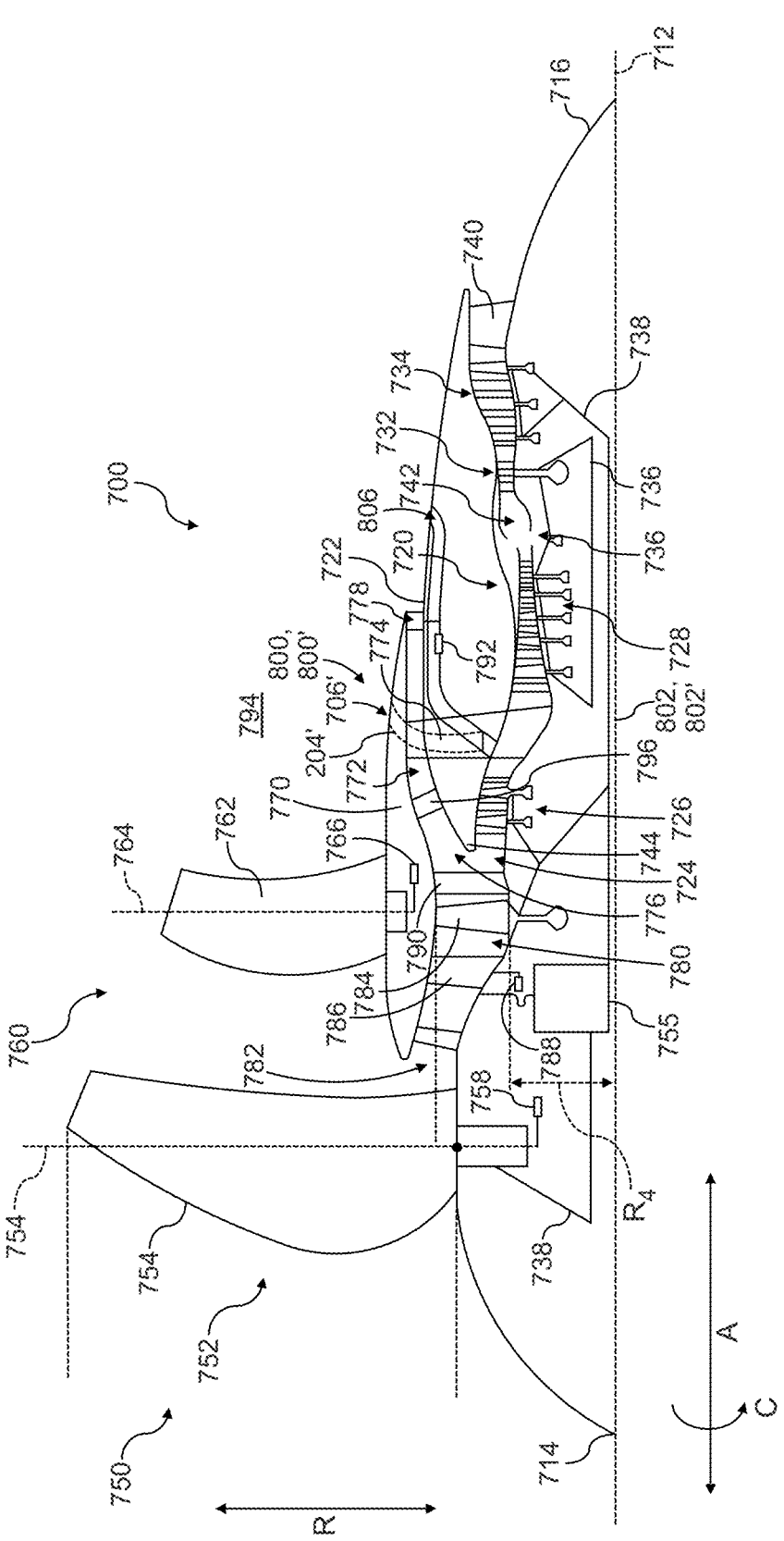
FIG. 15 is a schematic view of another exemplary gas turbine engine.

Referring now to FIG. 15, a schematic cross-sectional view of another gas turbine engine 700 is provided according to another example embodiment of the present disclosure. The embodiment of FIG. 15 may be configured in a similar manner as the exemplary gas turbine engine 600 in FIG. 13, as the exemplary gas turbine engine 100 in FIG. 1, or both. Similar numbers in FIG. 15 may refer to similar parts in FIGS. 1 and 13.

Particularly, FIG. 15 provides a turbofan engine having a rotor assembly with a single stage of unducted rotor blades. In such a manner, the rotor assembly may be referred to herein as an "unducted fan," or the entire gas turbine engine 700 may be referred to as an "unducted turbofan engine." In addition, the gas turbine engine 700 of FIG. 15 includes a third stream extending from the compressor section to a rotor assembly flowpath over the turbomachine, as will be explained in more detail below.

For reference, the gas turbine engine 700 defines an axial direction A, a radial direction R, and a circumferential direction C. Moreover, the gas turbine engine 700 defines an axial centerline or longitudinal axis 712 that extends along the axial direction A. In general, the axial direction A extends parallel to the longitudinal axis 712, the radial direction R extends outward from and inward to the longitudinal axis 712 in a direction orthogonal to the axial direction A, and the circumferential direction extends three hundred sixty degrees (360°) around the longitudinal axis 712. The gas turbine engine 700 extends between a forward end 714 and an aft end 716, e.g., along the axial direction A.

The gas turbine engine 700 includes a turbomachine 720 and a rotor assembly, also referred to a fan section 750, positioned upstream thereof. Generally, the turbomachine 720 includes, in serial flow order, a compressor section, a combustion section, a turbine section, and an exhaust section. Particularly, as shown in FIG. 15, the turbomachine 720 includes a core cowl 722 that defines a core inlet 724. The core cowl 722 further encloses at least in part a low pressure system and a high pressure system. For example, the core cowl 722 depicted encloses and supports at least in part a booster or low pressure ("LP") compressor 726 for pressurizing the air that enters the turbomachine 720 through core inlet 724. A high pressure ("HP"), multi-stage, axial-flow compressor 728 receives pressurized air from the LP compressor 726 and further increases the pressure of the air. The pressurized air stream flows downstream to a combustor 730 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 730 downstream to a high pressure turbine 732. The high pressure turbine 732 drives the high pressure compressor 728 through a high pressure shaft 736. In this regard, the high pressure turbine 732 is drivingly coupled with the high pressure compressor 728. The high energy combustion products then flow to a low pressure turbine 734. The low pressure turbine 734 drives the low pressure compressor 726 and components of the fan section 750 through a low pressure shaft 738. In this regard, the low pressure turbine 734 is drivingly coupled with the low pressure compressor 726 and components of the fan section 750. The LP shaft 738 is coaxial with the HP shaft 736 in this example embodiment. After driving each of the turbines 732, 734, the combustion products exit the turbomachine 720 through a turbomachine exhaust nozzle 740.

Accordingly, the turbomachine 720 defines a working gas flowpath or core duct 742 that extends between the core inlet 724 and the turbomachine exhaust nozzle 740. The core duct 742 is an annular duct positioned generally inward of the core cowl 722 along the radial direction R. The core duct 472 (e.g., the working gas flowpath through the turbomachine 720) may be referred to as a second stream.

The fan section 750 includes a fan 752, which is the primary fan in this example embodiment. For the depicted embodiment of FIG. 13, the fan 752 is an open rotor or unducted fan 752. In such a manner, the gas turbine engine 700 may be referred to as an open rotor engine.

As depicted, the fan 752 includes an array of fan blades 754 (only one shown in FIG. 15). The fan blades 754 are rotatable, e.g., about the longitudinal axis 712. As noted above, the fan 752 is drivingly coupled with the low pressure turbine 734 via the LP shaft 738. For the embodiments shown in FIG. 13, the fan 752 is coupled with the LP shaft 738 via a speed reduction gearbox 755, e.g., in an indirect-drive or geared-drive configuration.

Moreover, the array of fan blades 754 can be arranged in equal spacing around the longitudinal axis 712. Each fan blade 754 has a root and a tip and a span defined therebetween. Each fan blade 754 defines a central blade axis 756. For this embodiment, each fan blade 754 of the fan 752 is rotatable about its central blade axis 756, e.g., in unison with one another. One or more actuators 758 are provided to facilitate such rotation and therefore may be used to change a pitch of the fan blades 754 about their respective central blades' axes 756.

The fan section 750 further includes a fan guide vane array 760 that includes fan guide vanes 762 (only one shown in FIG. 15) disposed around the longitudinal axis 712. For this embodiment, the fan guide vanes 762 are not rotatable about the longitudinal axis 712. Each fan guide vane 762 has a root and a tip and a span defined therebetween. The fan guide vanes 762 may be unshrouded as shown in FIG. 13 or, alternatively, may be shrouded, e.g., by an annular shroud spaced outward from the tips of the fan guide vanes 762 along the radial direction R or attached to the fan guide vanes 762.

Each fan guide vane 762 defines a central blade axis 764. For this embodiment, each fan guide vane 762 of the fan guide vane array 760 is rotatable about its respective central blade axis 764, e.g., in unison with one another. One or more actuators 766 are provided to facilitate such rotation and therefore may be used to change a pitch of the fan guide vane 762 about its respective central blade axis 764. However, in other embodiments, each fan guide vane 762 may be fixed or unable to be pitched about its central blade axis 764. The fan guide vanes 762 are mounted to the fan cowl 770.

As shown in FIG. 15, in addition to the fan 752, which is unducted, a ducted fan 784 is included aft of the fan 752, such that the gas turbine engine 700 includes both a ducted and an unducted fan which both serve to generate thrust through the movement of air without passage through at least a portion of the turbomachine 720 (e.g., without passage through the HP compressor 728 and combustion section for the embodiment depicted). The ducted fan 784 is rotatable about the same axis (e.g., the longitudinal axis 712) as the fan blade 754. The ducted fan 784 is, for the embodiment depicted, driven by the low pressure turbine 734 (e.g. coupled to the LP shaft 738). In the embodiment depicted, as noted above, the fan 752 may be referred to as the primary fan, and the ducted fan 784 may be referred to as a secondary fan. It will be appreciated that these terms "primary" and "secondary" are terms of convenience, and do not imply any particular importance, power, or the like.

The ducted fan 784 includes a plurality of fan blades (not separately labeled in FIG. 13) arranged in a single stage, such that the ducted fan 784 may be referred to as a single stage fan. The fan blades of the ducted fan 784 can be arranged in equal spacing around the longitudinal axis 712. Each blade of the ducted fan 784 has a root and a tip and a span defined therebetween.

The fan cowl 770 annularly encases at least a portion of the core cowl 722 and is generally positioned outward of at least a portion of the core cowl 722 along the radial direction R. Particularly, a downstream section of the fan cowl 770 extends over a forward portion of the core cowl 722 to define a fan duct flowpath, or simply a fan duct 772. According to this embodiment, the fan flowpath or fan duct 772 may be understood as forming at least a portion of the third stream of the gas turbine engine 700.

Incoming air may enter through the fan duct 772 through a fan duct inlet 776 and may exit through a fan duct exhaust nozzle 778 to produce propulsive thrust. The fan duct 772 is an annular duct positioned generally outward of the core duct 742 along the radial direction R. The fan cowl 770 and the core cowl 722 are connected together and supported by a plurality of substantially radially-extending, circumferentially-spaced stationary struts 774 (only one shown in FIG. 15). The stationary struts 774 may each be aerodynamically contoured to direct air flowing thereby. Other struts in addition to the stationary struts 774 may be used to connect and support the fan cowl 770 and/or core cowl 722. In many embodiments, the fan duct 772 and the core duct 742 may at least partially co-extend (generally axially) on opposite sides (e.g., opposite radial sides) of the core cowl 722. For example, the fan duct 772 and the core duct 742 may each extend directly from a leading edge 744 of the core cowl 722 and may partially co-extend generally axially on opposite radial sides of the core cowl 722.

The gas turbine engine 700 also defines or includes an inlet duct 780. The inlet duct 780 extends between the engine inlet 782 and the core inlet 724/fan duct inlet 776. The engine inlet 782 is defined generally at the forward end of the fan cowl 770 and is positioned between the fan 752 and the fan guide vane array 760 along the axial direction A. The inlet duct 780 is an annular duct that is positioned inward of the fan cowl 770 along the radial direction R. Air flowing downstream along the inlet duct 780 is split, not necessarily evenly, into the core duct 742 and the fan duct 772 by a fan duct splitter or leading edge 744 of the core cowl 722. In the embodiment depicted, the inlet duct 780 is wider than the core duct 742 along the radial direction R. The inlet duct 780 is also wider than the fan duct 772 along the radial direction R.

Notably, for the embodiment depicted, the gas turbine engine 700 includes one or more features to increase an efficiency of a third stream thrust (e.g., a thrust generated by an airflow through the fan duct 772 exiting through the fan duct exhaust nozzle 778, generated at least in part by the ducted fan 784). In particular, the gas turbine engine 700 further includes an array of inlet guide vanes 786 positioned in the inlet duct 780 upstream of the ducted fan 784 and downstream of the engine inlet 782. The array of inlet guide vanes 786 are arranged around the longitudinal axis 712. For this embodiment, the inlet guide vanes 786 are not rotatable about the longitudinal axis 712. Each inlet guide vanes 786 defines a central blade axis (not labeled for clarity), and is rotatable about its respective central blade axis, e.g., in unison with one another. In such a manner, the inlet guide vanes 786 may be considered a variable geometry component. One or more actuators 788 are provided to facilitate such rotation and therefore may be used to change a pitch of the inlet guide vanes 786 about their respective central blade axes. However, in other embodiments, each inlet guide vanes 786 may be fixed or unable to be pitched about its central blade axis.

Further, located downstream of the ducted fan 784 and upstream of the fan duct inlet 776, the gas turbine engine 700 includes an array of outlet guide vanes 790. As with the array of inlet guide vanes 786, the array of outlet guide vanes 790 are not rotatable about the longitudinal axis 712. However, for the embodiment depicted, unlike the array of inlet guide vanes 786, the array of outlet guide vanes 790 are configured as fixed-pitch outlet guide vanes.

Further, it will be appreciated that for the embodiment depicted, the fan duct exhaust nozzle 778 of the fan duct 772 is further configured as a variable geometry exhaust nozzle.

In such a manner, the gas turbine engine 700 includes one or more actuators 792 for modulating the variable geometry exhaust nozzle. For example, the variable geometry exhaust nozzle may be configured to vary a total cross-sectional area (e.g., an area of the nozzle in a plane perpendicular to the longitudinal axis 712) to modulate an amount of thrust generated based on one or more engine operating conditions (e.g., temperature, pressure, mass flowrate, etc. of an airflow through the fan duct 772). A fixed geometry exhaust nozzle may also be adopted.

The combination of the array of inlet guide vanes 786 located upstream of the ducted fan 784, the array of outlet guide vanes 790 located downstream of the ducted fan 784, and the fan duct exhaust nozzle 778 may result in a more efficient generation of third stream thrust during one or more engine operating conditions. Further, by introducing a variability in the geometry of the inlet guide vanes 786 and the fan duct exhaust nozzle 778, the gas turbine engine 700 may be capable of generating more efficient third stream thrust across a relatively wide array of engine operating conditions, including takeoff and climb (where a maximum total engine thrust is generally needed) as well as cruise (where a lesser amount of total engine thrust is generally needed).

The gas turbine engine 700, as noted above includes a primary fan, or rather fan 752 having fan blades 754, and a secondary fan, or rather ducted fan 784 having fan blades 785. Airflow from the fan 752 is split between a bypass passage 794 and the inlet duct 780 by an inlet splitter. Airflow from the ducted fan 784 is split between the fan duct 772 and the core duct 742 by the leading edge 744 (sometimes also referred to as a fan duct splitter). The gas turbine engine 700 in such a form defines a "first" stream through the bypass passage 794, a "second" stream through the core duct 742, and a "third" stream through the fan duct 772.

Moreover, referring still to FIG. 15, in exemplary embodiments, air passing through the fan duct 772 may be relatively cooler (e.g., lower temperature) than one or more fluids utilized in the turbomachine 720. In this way, one or more heat exchangers 796 may be positioned in thermal communication with the fan duct 772. For example, one or more heat exchangers 796 may be disposed within the fan duct 772 and utilized to cool one or more fluids from the core engine with the air passing through the fan duct 772, as a resource for removing heat from a fluid, e.g., compressor bleed air, oil or fuel.

Although not depicted, the heat exchanger 796 may be an annular heat exchanger extending substantially 360 degrees in the fan duct 772 (e.g., at least 300 degrees, such as at least 330 degrees). In such a manner, the heat exchanger 796 may effectively utilize the air passing through the fan duct 772 to cool one or more systems of the gas turbine engine 700 (e.g., lubrication oil systems, compressor bleed air, electrical components, etc.). The heat exchanger 796 uses the air passing through the fan duct 772 as a heat sink and correspondingly increases the temperature of the air downstream of the heat exchanger 796 and exiting the fan duct exhaust nozzle 778.

The gas turbine engine 700 includes a bleed valve system 800. The bleed valve system 800 bleeds air from the core duct 742 between the LP compressor 726 and the HP compressor 728. As with the bleed valve system 680 of FIGS. 13-14, the bleed valve system 800 includes a bleed valve 802, a bleed valve exhaust duct 804 fluidly connected to the bleed valve 802, and a bleed valve exhaust nozzle 806 fluidly connected to the bleed valve exhaust duct 804. The bleed valve exhaust nozzle 806 may be disposed in the core cowl 722 or in the fan cowl 770, as described in further detail below. The bleed valve exhaust nozzle 806 is fluidly separated from the exhaust section, specifically from the fan duct exhaust nozzle 778. In particular, the bleed valve exhaust nozzle 806 extends aft of the exhaust section.

Figure 16:
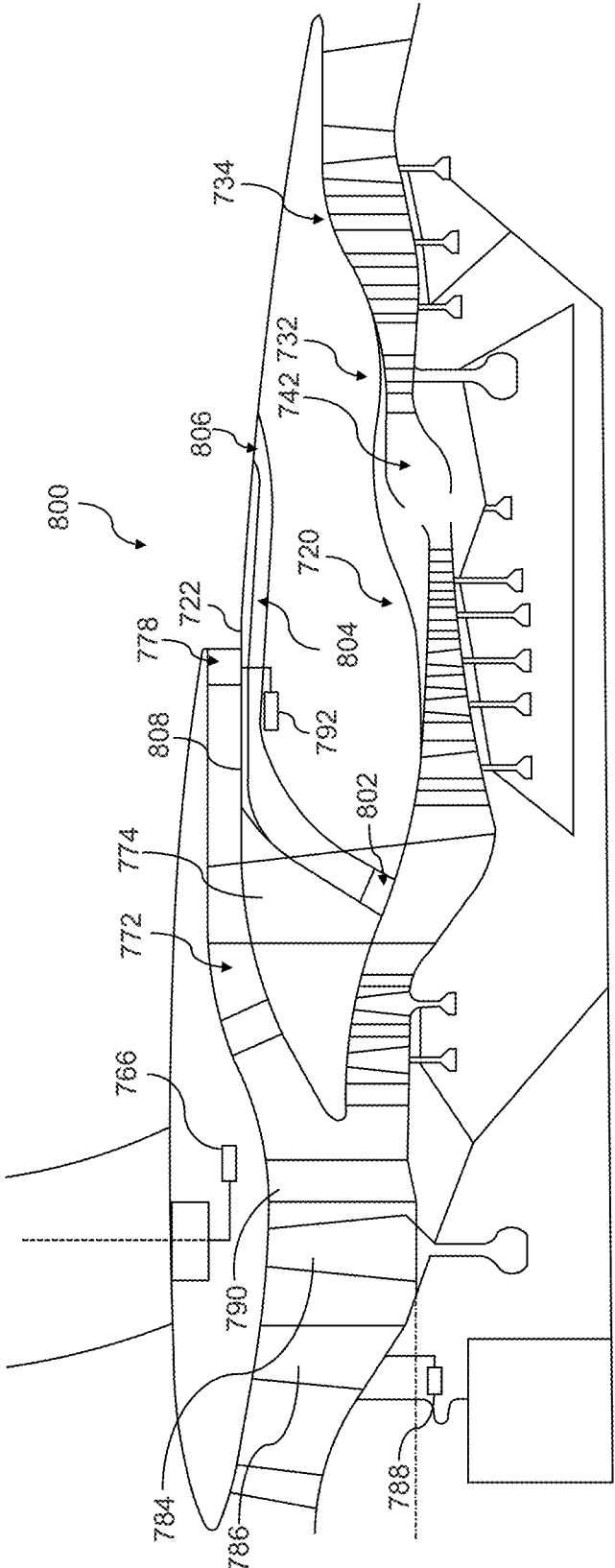
FIG. 16 is a magnified view of the exemplary gas turbine engine of FIG. 15 illustrating another bleed valve system.

Now referring to FIG. 16, a magnified view of the gas turbine engine 700 is shown illustrating the bleed valve system 800. The bleed valve 802 bleeds air from the core duct 742 into the bleed valve exhaust duct 804. The bleed valve exhaust duct 804 extends along and radially inside an outer surface of the core cowl 722 to the bleed valve exhaust nozzle 806. The bleed valve exhaust nozzle 806 extends along an outer surface 808 of the core cowl 722 downstream of the fan duct exhaust nozzle 778. In such a form, the bleed valve system 800 defines a "fourth" stream of the gas turbine engine 700 fluidly separated from the streams through the bypass passage 794 (the first stream), the core duct 742 (the second stream), and the fan duct 772 (the third stream). In particular, the bleed valve exhaust nozzle 806 is disposed inward in the radial direction R from the fan duct exhaust nozzle 778 and outward in the radial direction R from the turbomachine exhaust nozzle 740, disposing the fourth stream between the second and third streams.

Figure 17:
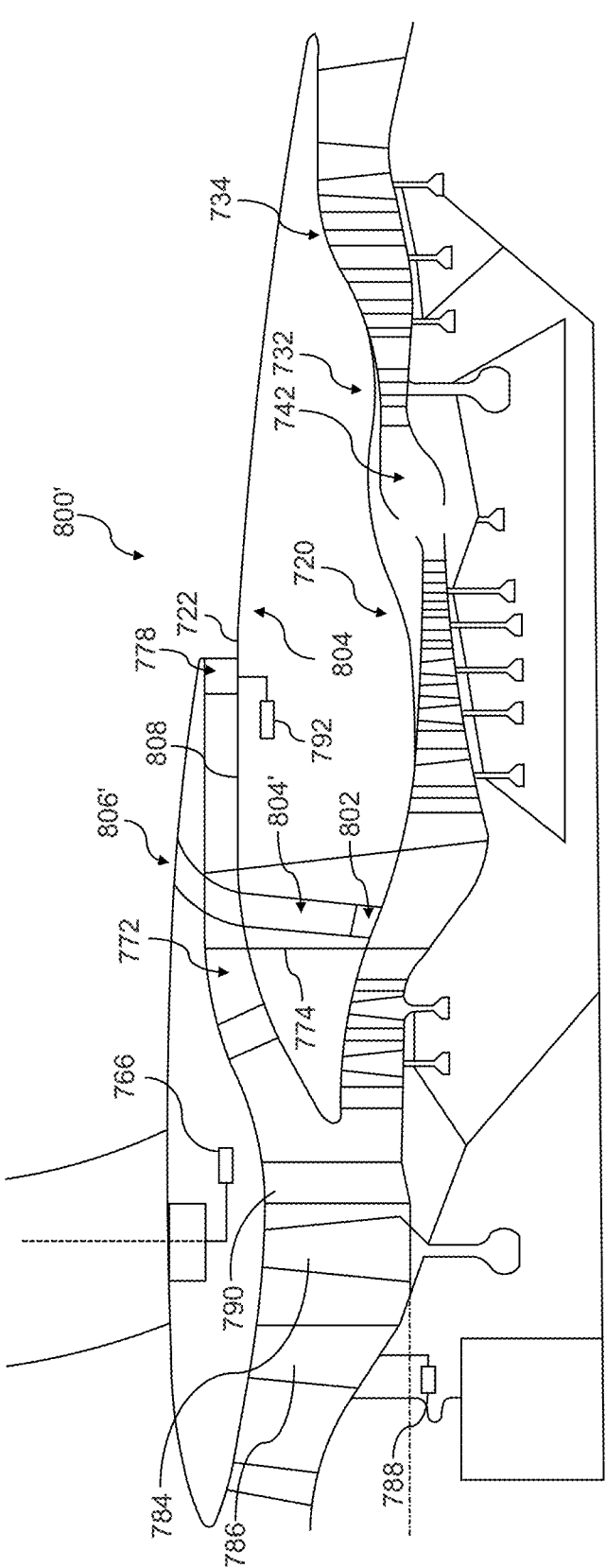
FIG. 17 is a magnified view of the exemplary gas turbine engine of FIG. 15 illustrating another bleed valve system.

With reference to FIG. 17, a magnified view of a gas turbine engine 700' is provided illustrating a bleed valve system 800'. It will be appreciated that the components of the gas turbine engines 700, 700' and the bleed valve systems 800, 800' are identical in form and function, only differing in location and arrangement. Particularly, the bleed valve system 800' includes a bleed valve 802', a bleed valve exhaust duct 804' fluidly connected to the bleed valve 802', and a bleed valve exhaust nozzle 806' fluidly connected to the bleed valve exhaust duct 804'. In FIG. 17, the bleed valve exhaust nozzle 806' is disposed in the fan cowl 770, outward in the radial direction R from the fan duct exhaust nozzle 778 and the turbomachine exhaust nozzle 740. Specifically, the bleed valve exhaust duct 804' extends through the strut 774 to the fan cowl 770.

Figure 18:
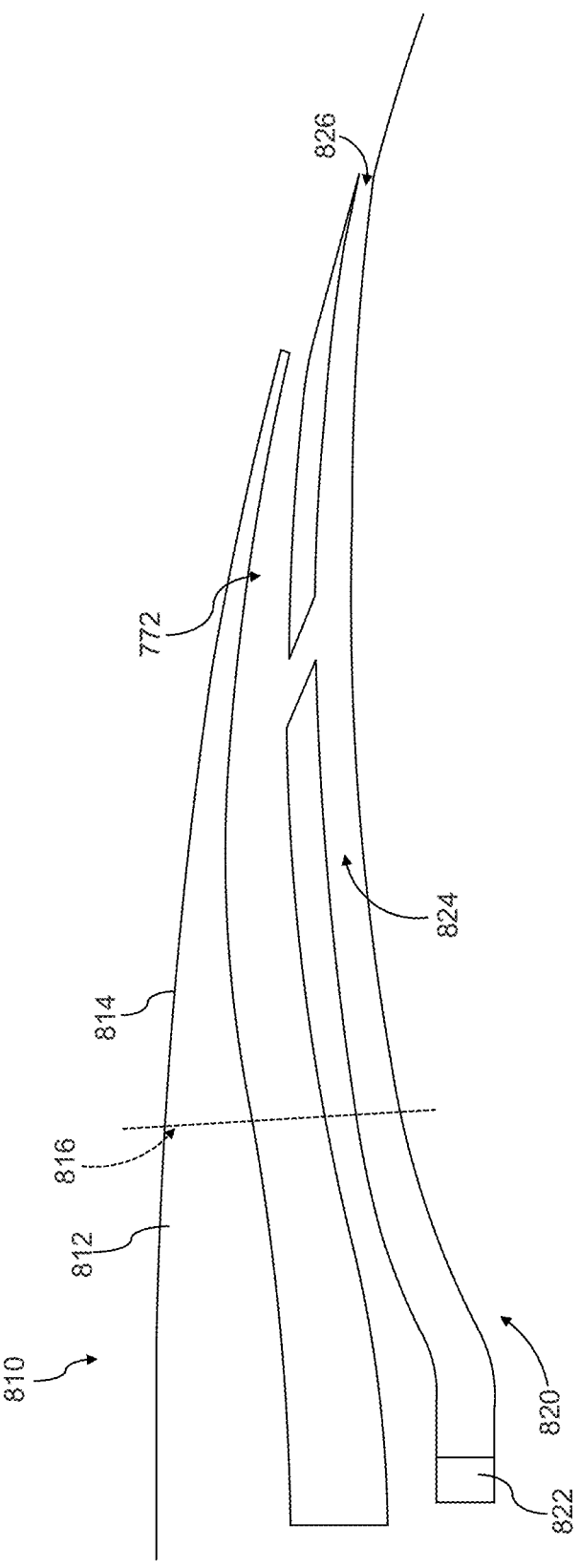
FIG. 18 is a schematic view of the exemplary gas turbine engine of FIG. 15 illustrating a passage connecting multiple streams.

Now referring to FIG. 18, a cross-sectional view of another gas turbine engine 810 is provided. The gas turbine engine 810 includes a forward portion 812, an aft portion 814, and an engine-nacelle interface 816. The engine-nacelle interface 816 is connector that connects the forward portion 812 to the aft portion 814, such as a hinge or a sealed joint. The engine-nacelle interface 816 extends circumferentially around the gas turbine engine 810.

The gas turbine engine 810 includes a fan duct 772 and a bleed valve system 820 including a bleed valve 822, a bleed valve exhaust duct 82, and a bleed valve exhaust nozzle 826. In FIG. 18, the fan duct 772 and the bleed valve exhaust duct 824 are fluidly connected through a passage 828. The passage 828 allows air to flow from the fan duct 772 into the bleed valve exhaust duct 824, reducing air flow in the fan duct 772. That is, while the fan duct exhaust nozzle 778 and the bleed valve exhaust nozzle 826 are fluidly separated and isolated from each other, the fan duct 772 and the bleed valve exhaust duct 824 are fluidly connected. The increased air flow in the bleed valve exhaust duct 824 may improve operation of the gas turbine engine 700 by reducing stall in the bleed valve exhaust duct 824, which improves aerodynamic performance of the fourth stream and reduces overall fuel consumption. The flow from the fan duct 772 to the bleed valve exhaust duct 824 reduces risk of acoustic resonances occurring in an otherwise stalled bleed valve exhaust duct 824.

The passage 828 of FIG. 18 is disposed downstream of the engine-nacelle interface 830. By locating the passage 828 downstream of the engine-nacelle interface 816, air travels most of the way through the fan duct 772 before being directed into the bleed valve exhaust duct 824, reducing interference with upstream heat exchangers 796. In such a form, the passage 828 is placed downstream of the engine-nacelle interface 816 so that the fan duct 772 and the bleed valve exhaust duct 824 pass by the engine-nacelle interface 816.

Figure 19:
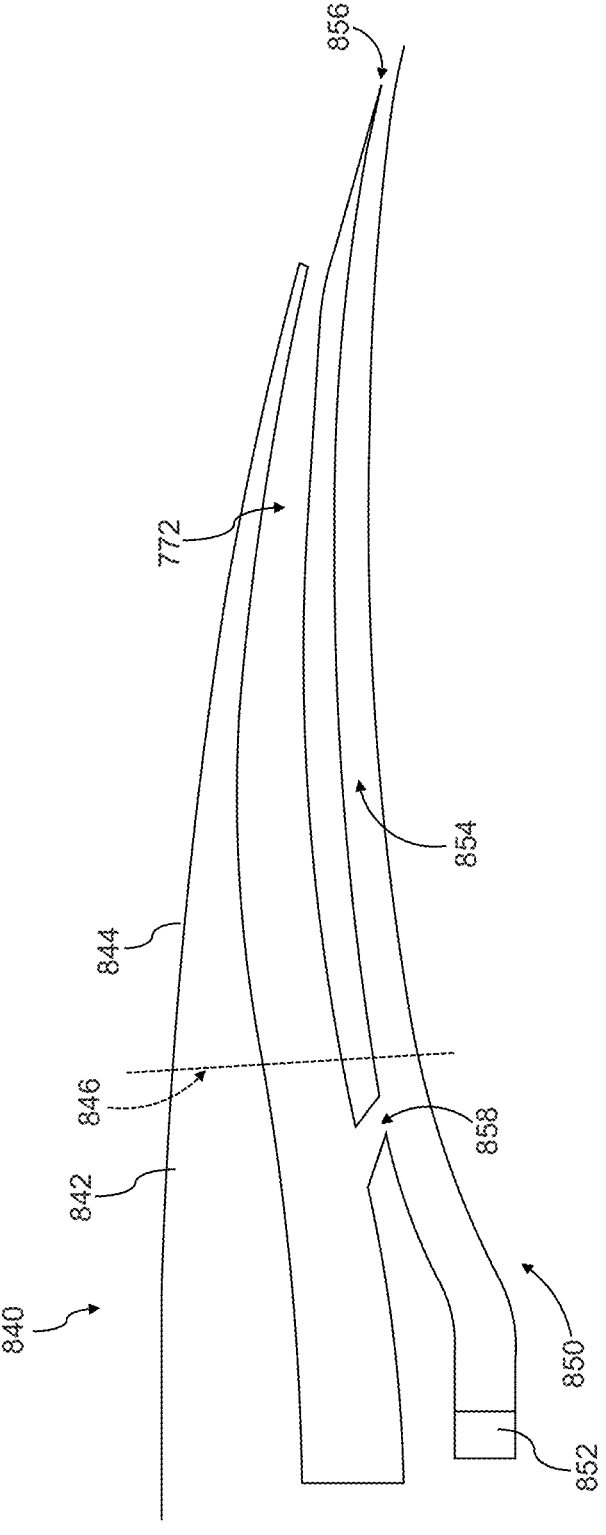
FIG. 19 is a schematic view of the exemplary gas turbine engine of FIG. 15 illustrating another passage connecting multiple streams.

Now referring to FIG. 19, a cross-sectional view of another gas turbine engine 840 is provided. The gas turbine engine 840 includes a forward portion 842, an aft portion 844, and an engine-nacelle interface 846. The gas turbine engine 840 includes a fan duct 772 and a bleed valve system 850 including a bleed valve 852, a bleed valve exhaust duct 854, and a bleed valve exhaust nozzle 856. The fan duct 772 and the bleed valve exhaust duct 854 are connected with a passage 858. In FIG. 19, the passage 858 is disposed upstream of the engine-nacelle interface 846. By placing the passage 858 upstream of the engine-nacelle interface 846, the complexity of the overall design of the gas turbine engine 840 is reduced and acoustic treatment in the fan duct 772 is improved.

Figure 20A:
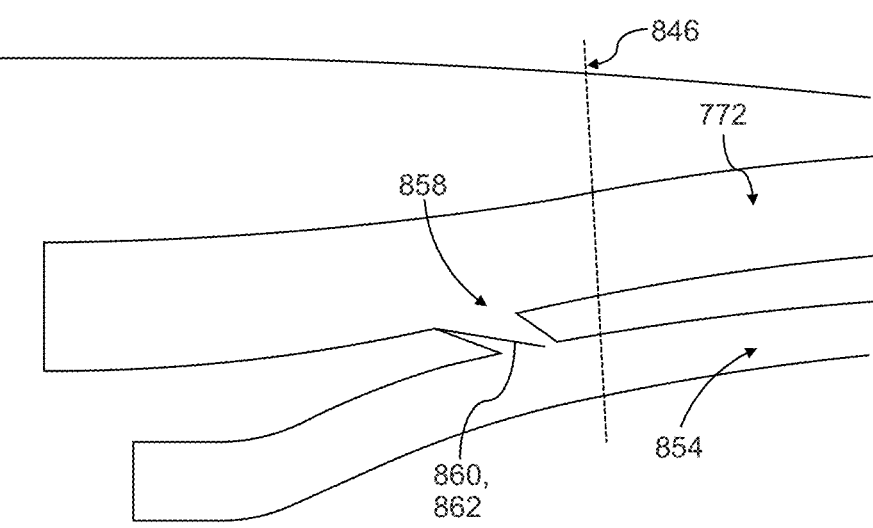
FIG. 20A is a magnified view of the passage of FIG. 19 illustrating a flow regulator.
Figure 20B:
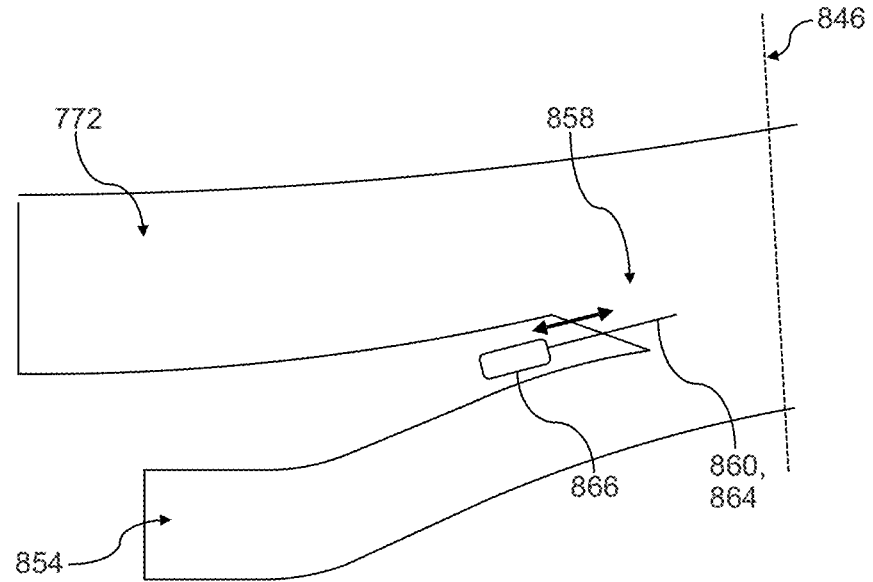
FIG. 20B is a magnified view of the passage of FIG. 19 illustrating another flow regulator.

With reference to FIGS. 20A-20B, a magnified view of a passage 858 connecting a fan duct 772 and a bleed valve exhaust duct 854 of a bleed valve system 850 is provided. A flow regulator 860 is disposed in the passage to allow air flow from the fan duct 772 to the bleed valve exhaust duct 854 and to reduce or inhibit air flow from the bleed valve exhaust duct 854 to the fan duct 772. That is, the flow regulator 860 allows flow only in one direction: from the fan duct 772 to the bleed valve exhaust duct 854. The flow regulator 860 inhibits pressure buildup in the fan duct 772, which improves operation of the ducted fan 784.

In FIG. 20A, the flow regulator 860 is a valve 862, which may include at least one of a spring-loaded door, a solenoid valve, a check valve, a one-way valve, or combinations thereof. In FIG. 20B, the flow regulator 860 is a sliding door 864 that is actuatable by a linear actuator 866 to extend across the passage 858, allowing or restricting flow through the passage 858. The linear actuator 866 may be controlled by a dedicated controller (not shown) or may be connected to other variable geometry components, such as variable bleed valve doors. Alternatively, the flow regulator 860 may be passively actuated by the pressure in the fan duct 772 being greater than the pressure in the bleed valve exhaust duct 854. Alternatively or additionally, the flow regulator 860 may be actively actuated by a controller (not shown) based on operation data, such as altitude data, pressure data outside the aircraft, pressure data in the fan duct 772 or combinations thereof.

Figure 21:
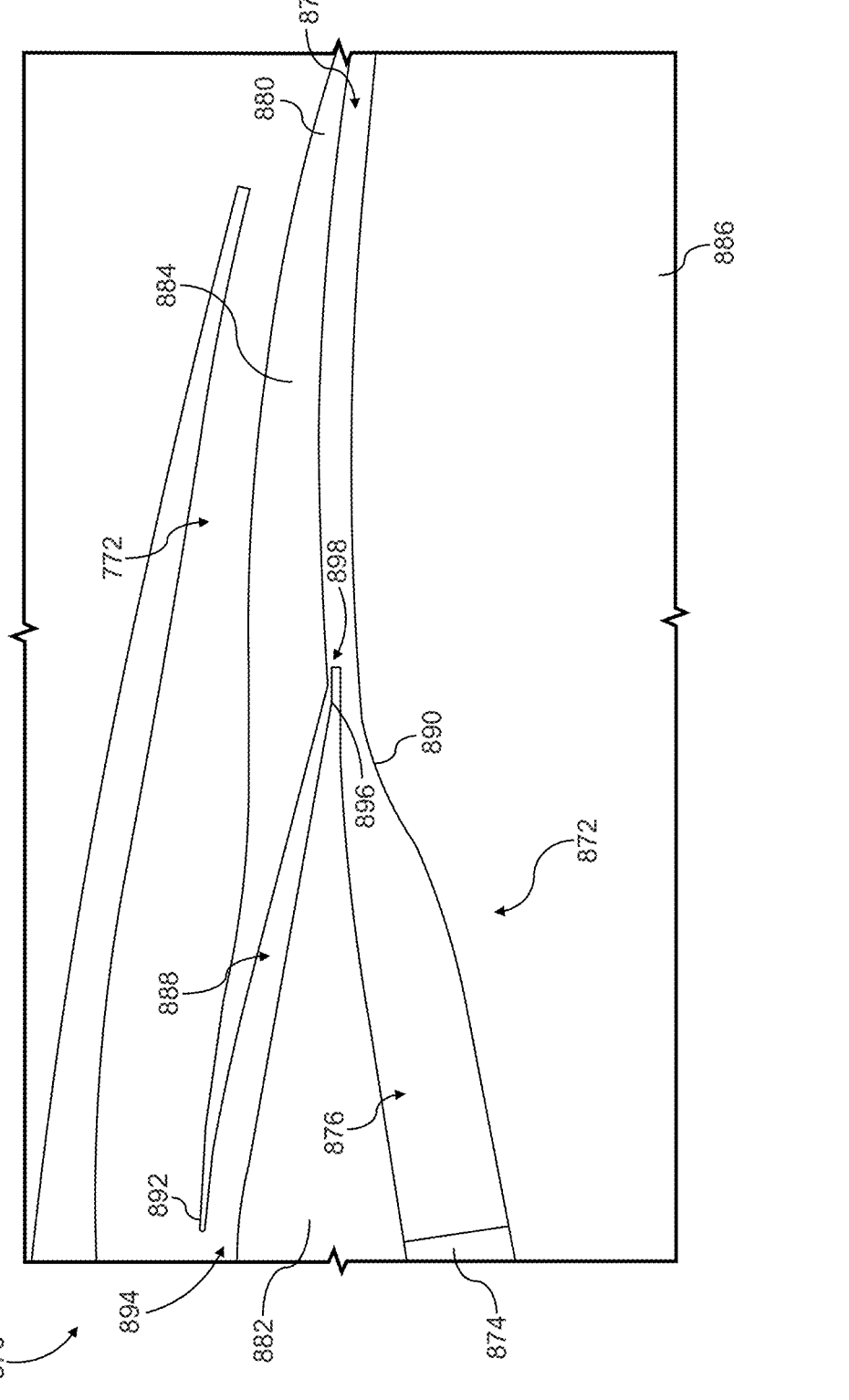
FIG. 21 is a schematic view of the exemplary gas turbine engine of FIG. 15 illustrating another passage connecting multiple streams.

Now referring to FIG. 21, a cross-sectional view of another gas turbine engine 870 is provided. The gas turbine engine 870 includes a fan duct 772 and a bleed valve system 872 including a bleed valve 874, a bleed valve exhaust duct 876, and a bleed valve exhaust nozzle 878. The fan duct 772 and the bleed valve exhaust duct 876 separated by a core cowl 880. The core cowl 880 includes a forward portion 882, and aft portion 848, a base portion 886, and a passage 888 between the forward and aft portions 848, 886. The base portion 886 includes an extension 890 that narrows the bleed valve exhaust duct 876 toward the forward and aft portions 882, 848 of the core cowl 880. The passage 888 fluidly connects the fan duct 772 to the bleed valve exhaust duct 876.

The aft portion 848 of the core cowl 880 includes an inlet scoop 892 at an inlet 894 of the passage, and the forward portion 882 of the core cowl 880 includes an outlet scoop 896 at an outlet 898 of the passage 888. The inlet and outlet scoops 892, 896 direct air from the fan duct 772 into the bleed valve exhaust duct 876 through the passage 888 while inhibiting air from flowing through the passage 888 from the bleed valve exhaust duct 876 to the fan duct 772. In particular, the extension 890 of the base portion 886 and the outlet scoop 896 form a Venturi passage that increases the speed of the air in the bleed valve exhaust duct 876 past the outlet 898 of the passage 888. The increased speed decreases air pressure in the bleed valve exhaust duct 876, causing air flow from the fan duct 772 into the passage 888. The inlet scoop 892 is directed aft to further increase air flow into the fan duct 772. The inlet and outlet scoops 892, 896 and the extension 890 may be designed to provide a specified amount of air flow from the fan duct 772 into the passage 888, such as 0.1-20% of the total air flow in the fan duct 772, and to reduce or inhibit flow from the bleed valve exhaust duct 876 to the fan duct 772. Such flow from the bleed valve exhaust duct 876 to the fan duct 772, which may be called "back flow," may reduce aerodynamic performance and turbomachine operability and may increase fuel consumption and acoustic noise.

Figure 22:
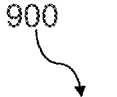
FIG. 22 is a perspective schematic view of a bleed valve system with a bleed valve exhaust duct including a plurality of discrete ducts.
Figure 22:
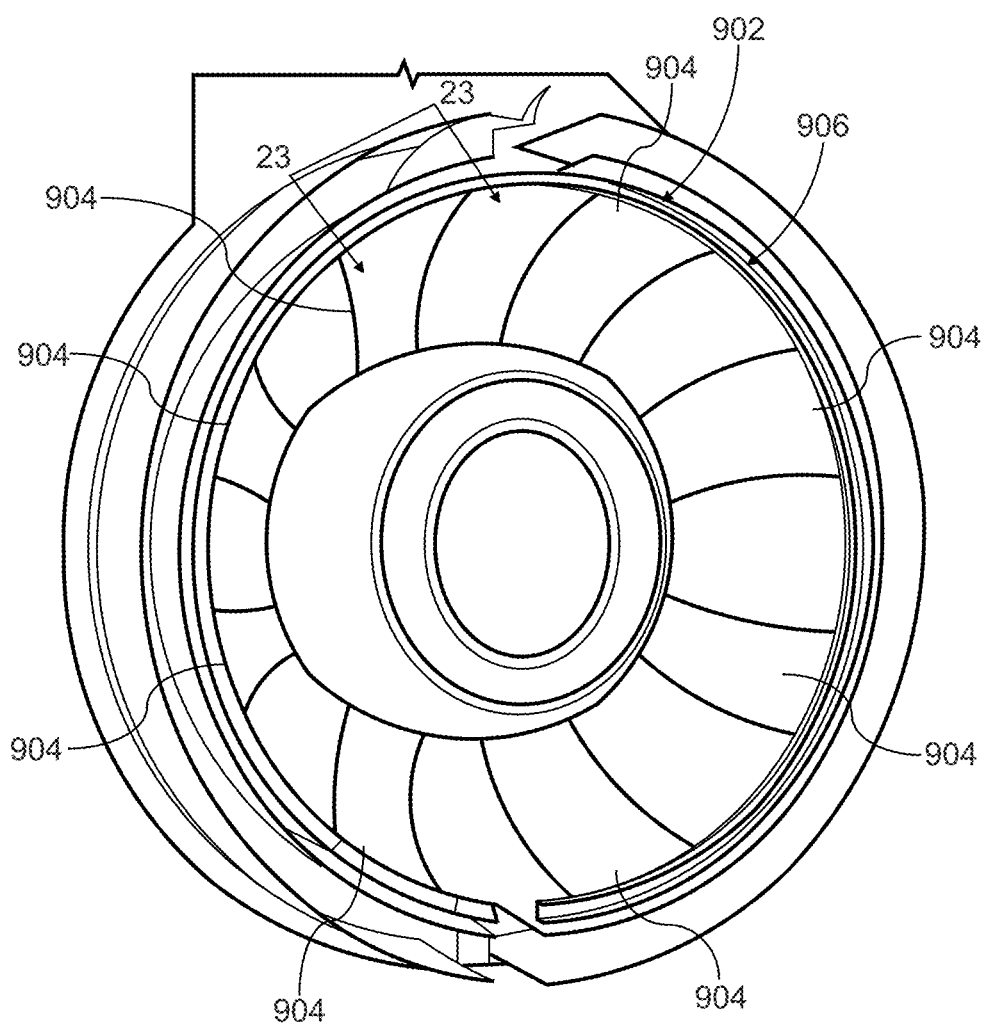

With reference to FIG. 22, an aft view of a bleed valve system 900 with an exemplary bleed valve exhaust duct 902 is provided. The bleed valve exhaust duct 902 includes a plurality of discrete ducts 904 arranged circumferentially around a bleed valve exhaust nozzle 906. In FIG. 22, eight ducts 904 are shown, and it will be appreciated that the bleed valve exhaust duct 902 may include a different number of ducts 904, such as six or ten. By separating the bleed valve exhaust duct 902 into discrete ducts 904, flow through the bleed valve exhaust duct 902 may be controlled more directly, such as by straightening the air flow into less turbulent flow through the ducts 904. Additionally, discrete ducts 904 address space constraints in the gas turbine engine 700 that may inhibit the use of a continuous, 360 degree duct. Such control improves air flow through the bleed valve exhaust duct 902 to the bleed valve exhaust nozzle 906.

Figure 23:
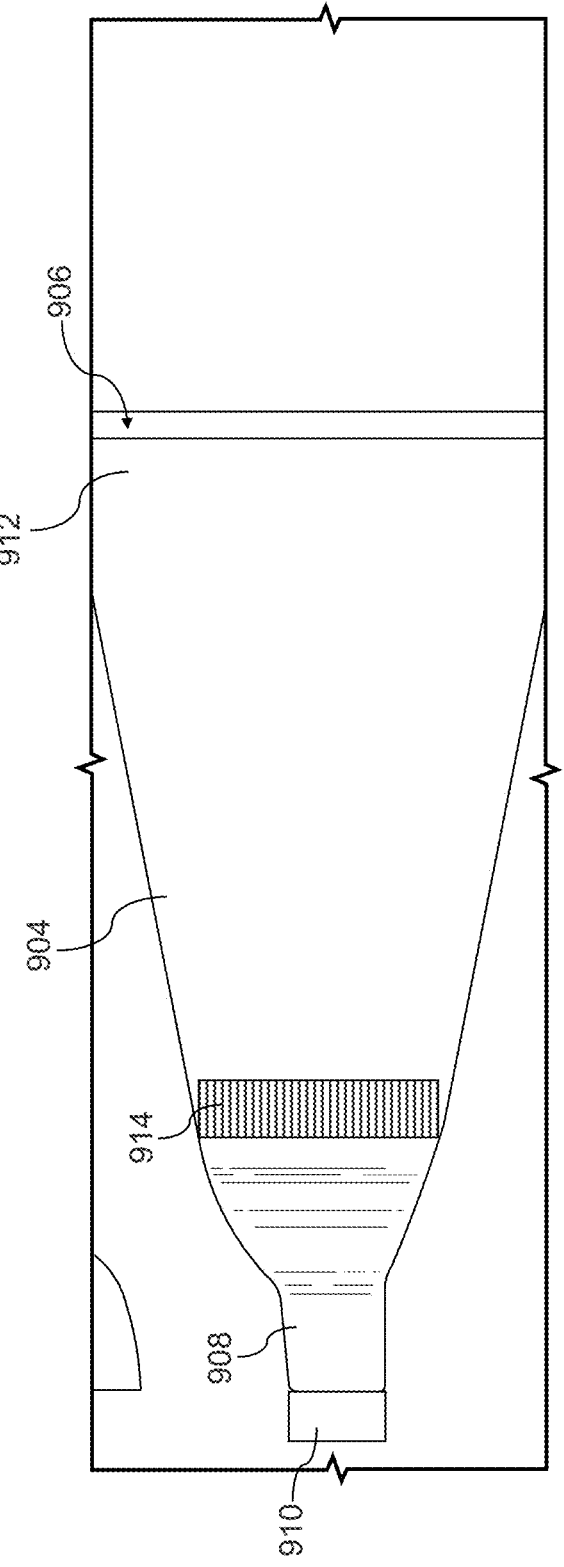
FIG. 23 is a top-down view of one of the discrete ducts of FIG. 22 along the line 11-11.

Now referring to FIG. 23, a magnified view of one of the ducts 904 is provided. The duct 904 includes a duct inlet 908 that is in fluid communication with a bleed valve 910 and a duct outlet 912 that is in fluid communication with the bleed valve exhaust nozzle 906. The duct 904 includes a flow straightener 914, such as a set of fins, grates, honeycombs, or the like, that aligns the flow of air from the duct inlet 908. It will be appreciated that flow straightener 914 is optional, and the duct 904 may include no devices between the duct inlet 908 and the duct outlet 912.

The duct 904 tapers from the duct outlet 912 to the duct inlet 908. That is, a width of the duct inlet 908 is narrower than a width of the duct outlet 912, and a width of the duct 904 expands from the duct inlet 908 to the duct outlet 912. The duct inlet 908 may be narrow to increase a speed of air flow from the bleed valve 910 into the duct 904, and the width expands to decrease the pressure of the air flow. The decreased pressure urges more air flow from the bleed valve 910 into the duct 904, which drives air flow to the duct outlet 912 and the bleed valve exhaust nozzle 906. Alternatively, not shown in FIG. 23, the duct inlet 908 may have a substantially same width between the duct inlet 908 and the duct outlet 912 to increase air flow rate through the duct 904.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

The gas turbine engine of any preceding clause, wherein the thrust to power airflow ratio and the core bypass ratio are defined when the gas turbine engine is operated at a rated speed during standard day operating conditions.

The gas turbine engine of any preceding clause, wherein the thrust to power airflow ratio between 4 and 75.

The gas turbine engine of any preceding clause, wherein the primary fan is an unducted primary fan, and wherein the thrust to power airflow ratio between 30 and 60.

The gas turbine engine of any preceding clause, wherein the thrust to power airflow ratio between 35 and 50.

The gas turbine engine of any preceding clause, wherein the core bypass ratio between 0.3 and 5.

The gas turbine engine of any preceding clause, wherein the gas turbine engine is a turboprop engine, and wherein the thrust to power airflow ratio between 40 and 100.

The gas turbine engine of any preceding clause, wherein the primary fan is a ducted primary fan, and wherein the thrust to power airflow ratio is between 3.5 and 40.

The gas turbine engine of any preceding clause, wherein the gas turbine engine is a direct drive gas turbine engine, and wherein the thrust to power airflow ratio is between 3.5 and 20.

The gas turbine engine of any preceding clause, wherein the gas turbine engine is a geared gas turbine engine, and wherein the thrust to power airflow ratio is between 8 and 40.

The gas turbine engine of any preceding clause, wherein the secondary fan is a single stage secondary fan.

The gas turbine engine of any preceding clause, wherein the secondary fan is a multi-stage secondary fan.

The gas turbine engine of any preceding clause, wherein the multi-stage secondary fan is a two stage secondary fan.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is upstream of the bypass passage outlet.

The gas turbine engine of any preceding clause, wherein the primary fan, the secondary fan, the compressor section, the combustion section, and the turbine section are arranged in serial flow order.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct.

The method of any preceding clause, wherein The gas turbine engine of claim 1, wherein the thrust to power airflow ratio between 4 and 75.

The method of any preceding clause, wherein the primary fan is an unducted primary fan, and wherein the thrust to power airflow ratio between 30 and 60.

The method of any preceding clause, wherein the thrust to power airflow ratio between 35 and 50.

The method of any preceding clause, wherein the core bypass ratio between 0.3 and 5.

A bleed valve system for a gas turbine engine, the bleed valve system including a bleed valve, a bleed valve exhaust duct fluidly connected to the bleed valve, and a bleed valve exhaust nozzle fluidly connected to the bleed valve exhaust duct, wherein the bleed valve exhaust duct and the bleed valve exhaust nozzle are fluidly separated from an exhaust nozzle of the gas turbine engine when the bleed valve system is installed in the gas turbine engine.

The bleed valve system of any of the preceding clauses, wherein the gas turbine engine defines a radial direction, wherein the bleed valve exhaust nozzle is disposed outward in the radial direction from the exhaust nozzle when the bleed valve system is installed in the gas turbine engine.

The bleed valve system of any of the preceding clauses, wherein the gas turbine engine defines a radial direction, wherein the bleed valve exhaust nozzle is disposed inward in the radial direction from the exhaust nozzle when the bleed valve system is installed in the gas turbine engine.

The bleed valve system of any of the preceding clauses, wherein the gas turbine engine includes an exhaust section and the bleed valve exhaust nozzle is fluidly separated from the exhaust section when the bleed valve system is installed in the gas turbine engine.

The bleed valve system of any of the preceding clauses, wherein the gas turbine engine includes a fan duct including a fan duct exhaust nozzle, and the exhaust nozzle is the fan duct exhaust nozzle.

The bleed valve system of any of the preceding clauses, wherein the gas turbine engine includes a passage, and wherein the bleed valve exhaust duct is fluidly connected to the fan duct through the passage when the bleed valve system is installed in the gas turbine engine.

The bleed valve system of any of the preceding clauses, further including a flow regulator disposed in the passage, the flow regulator configured to allow air flow from the fan duct to the bleed valve exhaust duct and to prevent air flow from the bleed valve exhaust duct to the fan duct.

The bleed valve system of any of the preceding clauses, wherein the flow regulator is one of a door or a valve.

The bleed valve system of any of the preceding clauses, further including an actuator configured to extend the flow regulator across the passage.

The bleed valve system of any of the preceding clauses, wherein the bleed valve exhaust nozzle extends aft of an exhaust section of the gas turbine engine.

The bleed valve system of any of the preceding clauses, wherein the bleed valve exhaust nozzle is fluidly isolated from the exhaust nozzle.

The bleed valve system of any of the preceding clauses, wherein the bleed valve exhaust duct includes a plurality of discrete ducts arranged circumferentially around the bleed valve exhaust nozzle.

The bleed valve system of any of the preceding clauses, wherein each of the plurality of discrete ducts extends from a duct inlet to a duct outlet.

The bleed valve system of any of the preceding clauses, wherein the duct inlet is in fluid communication with the bleed valve.

The bleed valve system of any of the preceding clauses, wherein the duct outlet is in fluid communication with the bleed valve exhaust nozzle.

The bleed valve system of any of the preceding clauses, wherein each of the discrete ducts has a width that increases from the duct inlet to the duct outlet.

A gas turbine engine defining a radial direction, the gas turbine engine including a turbomachine including a turbomachine exhaust nozzle, a fan section including a fan duct and a fan duct exhaust nozzle, and a bleed valve system including a bleed valve fluidly connected to the turbomachine, a bleed valve exhaust duct fluidly connected to the bleed valve, and a bleed valve exhaust nozzle fluidly connected to the bleed valve exhaust duct, wherein the bleed valve exhaust duct and the bleed valve exhaust nozzle are fluidly separated from the turbomachine exhaust nozzle and the fan duct exhaust nozzle.

The gas turbine engine of any of the preceding clauses, wherein the fan section defines a bypass passage, wherein the bleed valve exhaust duct and the bleed valve exhaust nozzle are fluidly separated from the bypass passage.

The gas turbine engine of any of the preceding clauses, wherein the bleed valve exhaust nozzle is disposed outward in the radial direction from the fan duct exhaust nozzle.

The gas turbine engine of any of the preceding clauses, wherein the bleed valve exhaust nozzle is disposed inward in the radial direction from the fan duct exhaust nozzle.

The gas turbine engine of any of the preceding clauses, wherein the bleed valve exhaust duct and the fan duct are fluidly connected through a passage.

The gas turbine engine of any of the preceding clauses, wherein the bleed valve exhaust nozzle extends aft of the turbomachine exhaust nozzle.

The gas turbine engine of any of the preceding clauses, wherein the bleed valve exhaust nozzle extends aft of the fan duct exhaust nozzle.

The gas turbine engine of any of the preceding clauses, wherein the bleed valve exhaust nozzle is fluidly isolated from the fan duct exhaust nozzle and the turbomachine exhaust nozzle.

The gas turbine engine of any of the preceding clauses, wherein the bleed valve exhaust duct is fluidly isolated from the fan duct.

The gas turbine engine of any of the preceding clauses, wherein the turbomachine further includes a core cowl, and the passage extends through the core cowl.

The gas turbine engine of any of the preceding clauses, wherein the passage includes an inlet at the fan duct and an outlet at the bleed valve exhaust duct, wherein the core cowl includes an inlet scoop at the inlet and an outlet scoop at the outlet.

The gas turbine engine of any of the preceding clauses, wherein the core cowl includes an extension that defines a Venturi passage with the outlet scoop.

The gas turbine engine of any of the preceding clauses, wherein the turbomachine further includes a core cowl, wherein the bleed valve exhaust duct extends along an outer surface of the core cowl.

The gas turbine engine of any of the preceding clauses, wherein the passage, the inlet scoop, and the outlet scoop are configured to allow 0.1-20% of a total air flow of the fan duct through the passage.

The gas turbine engine of any of the preceding clauses, wherein the core cowl includes a forward portion, and aft portion, and a base portion.

The gas turbine engine of any of the preceding clauses, wherein the forward portion includes the inlet scoop and the rear portion includes the outlet scoop.

The gas turbine engine of any of the preceding clauses, wherein the base portion includes an extension that narrows the bleed valve exhaust duct toward the forward and aft portions.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; a secondary fan located downstream of the primary fan within the inlet duct, wherein the gas turbine engine defines a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; an exhaust nozzle; and a bleed valve system having a bleed valve exhaust duct and a bleed valve, the bleed valve exhaust duct fluidly separated from the exhaust nozzle.

The gas turbine engine of any of the preceding clauses, wherein the exhaust nozzle is a fan duct exhaust nozzle of the fan duct.

The gas turbine engine of any of the preceding clauses, wherein the gas turbine engine comprises a passage, and wherein the bleed valve exhaust duct is fluidly connected to the fan duct through the passage.

The gas turbine engine of any of the preceding clauses, further comprising: a flow regulator disposed in the passage, the flow regulator configured to allow air flow from the fan duct to the bleed valve exhaust duct and to prevent air flow from the bleed valve exhaust duct to the fan duct.

The gas turbine engine of any of the preceding clauses, wherein the gas turbine engine defines a radial direction, wherein the bleed valve exhaust nozzle is disposed outward in the radial direction from the exhaust nozzle.

The gas turbine engine of any of the preceding clauses, wherein the gas turbine engine defines a radial direction, wherein the bleed valve exhaust nozzle is disposed outward in the radial direction from the exhaust nozzle.

The gas turbine engine of any of the preceding clauses, wherein the bleed valve exhaust nozzle extends aft of an exhaust section of the gas turbine engine.

The gas turbine engine of any of the preceding clauses, wherein the bleed valve exhaust duct includes a plurality of discrete ducts arranged circumferentially around the bleed valve exhaust nozzle.

The gas turbine engine of any of the preceding clauses, wherein the thrust to power airflow ratio and the core bypass ratio are defined when the gas turbine engine is operated at a rated speed during standard day operating conditions.

The gas turbine engine of any of the preceding clauses, wherein the thrust to power airflow ratio is between 4 and 75, and wherein the core bypass ratio is between 0.3 and 5.

The gas turbine engine of any of the preceding clauses, wherein the primary fan is an unducted primary fan, and wherein the thrust to power airflow ratio is between 30 and 60.

The gas turbine engine of any of the preceding clauses, wherein the thrust to power airflow ratio is between 35 and 50.

The gas turbine engine of any of the preceding clauses, wherein the secondary fan is a single stage secondary fan.

The gas turbine engine of any of the preceding clauses, wherein the primary fan, the secondary fan, the compressor section, the combustion section, and the turbine section are arranged in serial flow order.

The gas turbine engine of any of the preceding clauses, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine engine of any of the preceding clauses, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is upstream of the bypass passage outlet.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct; wherein the gas turbine engine further comprises an exhaust nozzle and a bleed valve system having a bleed valve exhaust duct and a bleed valve, the bleed valve exhaust duct fluidly separated from the exhaust nozzle.

The method of any of the preceding clauses, wherein the exhaust nozzle is a fan duct exhaust nozzle of the fan duct.

The method of any of the preceding clauses, wherein the gas turbine engine comprises a passage, and wherein the bleed valve exhaust duct is fluidly connected to the fan duct through the passage.

The method of any of the preceding clauses, wherein the thrust to power airflow ratio is between 35 and 50, and wherein the core bypass ratio is between 0.3 and 5.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; a secondary fan located downstream of the primary fan within the inlet duct, wherein the gas turbine engine defines a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and a fourth stream.

The gas turbine engine of the preceding clauses, further comprising: a bleed valve system, wherein the fourth stream is a bleed valve exhaust duct of the bleed valve system.

The gas turbine engine of the preceding clauses, further comprising: an exhaust nozzle, wherein the bleed valve system further comprises a bleed valve, and wherein the bleed valve exhaust duct is fluidly separated from the exhaust nozzle.

The gas turbine engine of the preceding clauses, wherein the fourth stream extends from the compressor section of the turbomachine.

We claim:

1. A gas turbine engine comprising:
   a turbomachine comprising a compressor section, a combustion section, and a turbine section arranged in serial flow order, the turbomachine defining an engine inlet to an inlet duct, a fan duct inlet to a fan duct, and a core inlet to a core duct;
   a primary fan driven by the turbomachine;
   a secondary fan located downstream of the primary fan within the inlet duct, wherein the gas turbine engine defines a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct;
   an exhaust nozzle; and
   a bleed valve system having a bleed valve exhaust duct and a bleed valve, the bleed valve exhaust duct fluidly separated from the exhaust nozzle.

2. The gas turbine engine of claim 1, wherein the exhaust nozzle is a fan duct exhaust nozzle of the fan duct.

3. The gas turbine engine of claim 2, wherein the gas turbine engine comprises a passage, and wherein the bleed valve exhaust duct is fluidly connected to the fan duct through the passage.

4. The gas turbine engine of claim 3, further comprising:
   a flow regulator disposed in the passage, the flow regulator configured to allow air flow from the fan duct to the bleed valve exhaust duct and to prevent air flow from the bleed valve exhaust duct to the fan duct.

5. The gas turbine engine of claim 1, wherein the gas turbine engine defines a radial direction, wherein the bleed valve exhaust nozzle is disposed outward in the radial direction from the exhaust nozzle.

6. The gas turbine engine of claim 1, wherein the gas turbine engine defines a radial direction, wherein the bleed valve exhaust nozzle is disposed outward in the radial direction from the exhaust nozzle.

7. The gas turbine engine of claim 1, wherein the bleed valve exhaust nozzle extends aft of an exhaust section of the gas turbine engine.

8. The gas turbine engine of claim 1, wherein the bleed valve exhaust duct includes a plurality of discrete ducts arranged circumferentially around the bleed valve exhaust nozzle.

9. The gas turbine engine of claim 1, wherein the thrust to power airflow ratio and the core bypass ratio are defined when the gas turbine engine is operated at a rated speed during standard day operating conditions.

10. The gas turbine engine of claim 1, wherein the thrust to power airflow ratio is between 4 and 75, and wherein the core bypass ratio is between 0.3 and 5.

11. The gas turbine engine of claim 1, wherein the primary fan is an unducted primary fan, and wherein the thrust to power airflow ratio is between 30 and 60.

12. The gas turbine engine of claim 11, wherein the thrust to power airflow ratio is between 35 and 50.

13. The gas turbine engine of claim 1, wherein the secondary fan is a single stage secondary fan.

14. The gas turbine engine of claim 1, wherein the primary fan, the secondary fan, the compressor section, the combustion section, and the turbine section are arranged in serial flow order.

15. A method of operating a gas turbine engine, comprising:
   operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5,
   wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct;
   wherein the gas turbine engine further comprises an exhaust nozzle and a bleed valve system having a bleed valve exhaust duct and a bleed valve, the bleed valve exhaust duct fluidly separated from the exhaust nozzle.

16. The method of claim 15, wherein the exhaust nozzle is a fan duct exhaust nozzle of the fan duct.

17. A gas turbine engine comprising:
   a turbomachine comprising a compressor section, a combustion section, and a turbine section arranged in serial flow order, the turbomachine defining an engine inlet to an inlet duct, a fan duct inlet to a fan duct, and a core inlet to a core duct;
   a primary fan driven by the turbomachine;
   a secondary fan located downstream of the primary fan within the inlet duct, wherein the gas turbine engine defines a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct; and
   a fourth stream.

18. The gas turbine engine of claim 17, further comprising:

a bleed valve system, wherein the fourth stream is a bleed valve exhaust duct of the bleed valve system.

19. The gas turbine engine of claim 18, further comprising:

an exhaust nozzle, wherein the bleed valve system further comprises a bleed valve, and wherein the bleed valve exhaust duct is fluidly separated from the exhaust nozzle.

20. The gas turbine engine of claim 17, wherein the fourth stream extends from the compressor section of the turbomachine.

* * * * *